(12) United States Patent
Wolkowicki

(10) Patent No.: US 11,947,547 B1
(45) Date of Patent: *Apr. 2, 2024

(54) CONTEXTUAL SEARCH USING DATABASE INDEXES

(71) Applicant: Dazah Holdings, LLC, Bayside, NY (US)

(72) Inventor: Danielle Wolkowicki, Floral Park, NY (US)

(73) Assignee: Dazah Holdings LLC, Bayside, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,264

(22) Filed: Apr. 19, 2021

Related U.S. Application Data

(63) Continuation of application No. 16/410,094, filed on May 13, 2019, now Pat. No. 11,010,389, which is a continuation of application No. 15/687,423, filed on Aug. 25, 2017, now Pat. No. 10,331,677.

(60) Provisional application No. 62/379,566, filed on Aug. 25, 2016.

(51) Int. Cl.
  *G06F 16/2457* (2019.01)
  *G06F 16/22* (2019.01)
  *G06Q 50/00* (2012.01)

(52) U.S. Cl.
  CPC ........ *G06F 16/24575* (2019.01); *G06F 16/22* (2019.01); *G06Q 50/01* (2013.01)

(58) Field of Classification Search
  CPC ..... G06F 16/24575; G06F 16/22; G06F 50/01
  See application file for complete search history.

(56) References Cited

U.S. PATENT DOCUMENTS

| | | |
|---|---|---|
| 6,735,568 B1 | 5/2004 | Buckwalter et al. |
| 7,707,122 B2 | 4/2010 | Hull et al. |
| 9,799,081 B1 | 10/2017 | Lewis et al. |
| 10,331,677 B1 | 6/2019 | Horowitz |

(Continued)

FOREIGN PATENT DOCUMENTS

WO    2008022323 A2    2/2008

OTHER PUBLICATIONS

Notice of Allowance, dated Apr. 3, 2019, U.S. Appl. No. 15/687,423, filed Aug. 25, 2017, 8 pages.

(Continued)

*Primary Examiner* — William Spieler
(74) *Attorney, Agent, or Firm* — POLSINELLI LLP

(57) ABSTRACT

Provided are systems, methods, and computer-program products for a contextual connection system. In various implementations, the system can receive data corresponding to an interaction between a first node and a second node. The system can use an interaction history to associate the first node with a subset of other nodes. The system can receive input corresponding to a search, where the search is associated with the third node. The search requests a list of nodes, where nodes in the list of nodes are likely to accept a connection request from the third node. The system can determine similarity between the third node and the second node. Determining the similarity can further include using the similarity and a result of searching to identify the context associated with the first node. The system can add the first node to the list of nodes, and respond to the search with the list of nodes.

21 Claims, 11 Drawing Sheets

(56) References Cited

U.S. PATENT DOCUMENTS

| | | | |
|---|---|---|---|
| 2002/0040310 | A1 | 4/2002 | Lieben et al. |
| 2003/0050977 | A1 | 3/2003 | Puthenkulam et al. |
| 2006/0282426 | A1 | 12/2006 | Spears |
| 2011/0173198 | A1 | 7/2011 | Malleshalah et al. |
| 2013/0166574 | A1 | 6/2013 | Kang |
| 2014/0012926 | A1 | 1/2014 | Narayanan et al. |
| 2014/0114774 | A1* | 4/2014 | Schultz ............ G06Q 50/01 709/204 |
| 2014/0280359 | A1 | 9/2014 | Baecklund |
| 2015/0026083 | A1 | 1/2015 | Paliwal et al. |
| 2016/0321549 | A1* | 11/2016 | Kuvshynov ......... G06K 9/6282 |
| 2016/0335572 | A1* | 11/2016 | Bennett ............. G06Q 10/107 |

OTHER PUBLICATIONS

Non-final Office Action, dated Oct. 19, 2018, U.S. Appl. No. 15/687,423, filed Aug. 25, 2017, 8 pages.

First Action Interview Office Action Summary, dated Jan. 12, 2018, U.S. Appl. No. 15/687,423, filed Aug. 25, 2017, 6 pages.

First Action Interview Pilot Program Pre-Interview Communication, dated Nov. 6, 2017, U.S. Appl. No. 15/687,423, filed Aug. 25, 2017, 7 pages.

Notice of Allowance, dated Jan. 21, 2021, U.S. Appl. No. 16/410,094, filed May 13, 2019, 5 pages.

Final Office Action, dated May 22, 2018, U.S. Appl. No. 15/687,423, filed Aug. 25, 2017, 10 pages.

\* cited by examiner

CONTEXTUAL SEARCH USING DATABASE INDEXES

CROSS-REFERENCES TO RELATED APPLICATIONS

This application is a continuation of U.S. Pat. No. 16,410,094, filed on May 13, 2019, which is a continuation of U.S. patent application Ser. No. 15/687,423, filed on Aug. 25, 2017, which claims priority to U.S. Provisional Application No. 62/379,566, filed on Aug. 25, 2016, which are incorporated herein by reference in their entirety.

BRIEF SUMMARY

In various implementations, provided are methods, including computer-implemented methods, computing devices, and computer-readable medium for a contextual connection system. In various implementations, the contextual connection system can enable users, represented by nodes in the system, to interact. The contextual connection system can store data about the nodes and the interactions in a database. The contextual connection system can further use the data in the database to perform contextually relevant searches on behalf of a node. In various implementations, the data considered by the search can include data generated through use of multiple different, unrelated applications. Results from a contextually relevant search can include nodes that are highly likely to accept a connection request from the node that initiated the search. In various implementations, the contextual connection system can also include flow control mechanisms, to control the rate at which connection requests are allowed and to increase the likelihood that connection requests will be accepted.

In various implementations, a contextual connection system can be hosted by a computing device. In various implementations, the contextual connection system can receive data corresponding to an interaction between a first node and a second node. The contextual connection system can include a database and one or more database indexes. The one or more database indexes can be derived from the database. The contextual connection system can store the data in the database. Storing the data can include adding the information to a history of interactions between a plurality of nodes. The plurality of nodes includes the first node, the second node, and one or more additional nodes. The contextual connection system can associate the first node with a subset of the one or more additional nodes. Making the association can include determining that the first node has had a quantity of interactions with nodes in the subset, where the quantity is greater than a threshold. The contextual connection system can determine a context associated with the first node, where the context is determined using the history of interactions. The context can associate the second node with the subset. The context can be stored in the one or more database indexes. The contextual connection system can receive input corresponding to a search, where the search is associated with the third node. The search requests a list of nodes, where nodes in the list of nodes are likely to accept a connection request from the third node. The contextual connection system can determine, in response to the input, a similarity between the third node and the second node. Determining the similarity can include searching the one or more database indexes. Determining the similarity can further include using the similarity and a result of searching to identify the context associated with the first node. The contextual connection system can determine a score for the first node, where the score is determined using the one or more database indexes and the context. The score can be associated with a likelihood that the first node will accept a connection request from the third node. The contextual connection system can add the first node to the list of nodes, and respond to the search with the list of nodes.

In some implementations, prior to receiving the input corresponding to the search, the history of interactions does not include an interaction between the third node and the first node.

In some implementations, the contextual connection system can further update the one or more database indexes, where updating includes associating the first node with the subset and determining the context.

In some implementations, the contextual connection system can further determine a parameter associated with the search. The contextual connection system can use the parameter to filter records in the one or more database indexes when searching the one or more database indexes.

In some implementations, the contextual connection system can further determine a parameter associated with the search. The contextual connection system can determine an attribute associated with the third node, where determining includes using the parameter. The contextual connection system can use using the attribute to filter records in the one or more database indexes when searching the one or more database indexes.

In some implementations, the contextual connection system can further determine an attribute associated with the third node, and use the attribute to determine the similarity between the third node and the second node. In some implementations, the third node and the second node are similar when the attribute associated with the third node is the same as an attribute associated with the second node. In some implementations, the third node and the second node are similar when the attribute associated with the third node compliments an attribute associated with the second node.

In some implementations, the contextual connection system can further determine an attribute associated with the third node, and use the attribute and a record in the one or more database indexes to identify the context associated with the first node. The record can be associated with the first node.

In some implementations, the input corresponding to the search originated at an application. In these implementations, the contextual connection system can filter a record from the one or more database indexes. Filtering can remove the record from consideration when searching the one or more database indexes. The record can be filtered when the record is not associated with the application.

In some implementations, the input corresponding to the search originated at an application. In these implementations, determining the context can include determining a set of interactions from the history of interactions that are inaccessible to the application. The set of interactions can be excluded when the context is determined.

In some implementations, an interaction is inaccessible to the application when a node associated with the interaction is not associated with the application.

In some implementations, the input corresponding to the search originated at an application. In these implementations, the contextual connection system can determine a group of nodes that includes the third node. The group of nodes can be associated with the application. Searching the one or more database indexes can include excluding a record that is associated with a node that is not in the group of nodes.

In some implementations, the contextual connection system can further determine a weight, where the weight is associated with the search. The contextual connection system can use the weight to determine the score for the first node. In some implementations, the weight is associated with an application, and wherein input corresponding to the search originated at the application.

In some implementations, the one or more database indexes include a record associated with the first node and determining the score for the first node includes determining a value for each of one or more entries in the record and summing the values. In some implementations, the value is associated with an attribute associated with the third node. In some implementations, the value is associated with an application, wherein the input corresponding to the search originated at the application.

In some implementations, the contextual connection system can further increase the score for the first node when the context indicates that the first node is associated with a high rate of activity. In some implementations, the contextual connection system can further increase the score for the first node when the context indicates that the first node has had recent interactions. In some implementations, the contextual connection system can further increase the score for the first node when the context indicates that connection requests from the first node are frequently accepted.

In some implementations, the contextual connection system can further decrease the score for the first node when the context indicates that connection requests from the first node are frequently rejected. In some implementations, the contextual connection system can further decrease the score for the first node when the context indicates frequent bypasses of the first node by other nodes. In some implementations, the contextual connection system can further decrease the score for the first node when a profile associated with the first node is incomplete.

BRIEF DESCRIPTION OF THE DRAWINGS

Various examples are described in detail below with reference to the following figures:

FIG. 7 illustrates an example of the relationship between an initiating node, a node that is returned in search results, and nodes that the node in the search results has interacted with;

DETAILED DESCRIPTION

Figure 1:
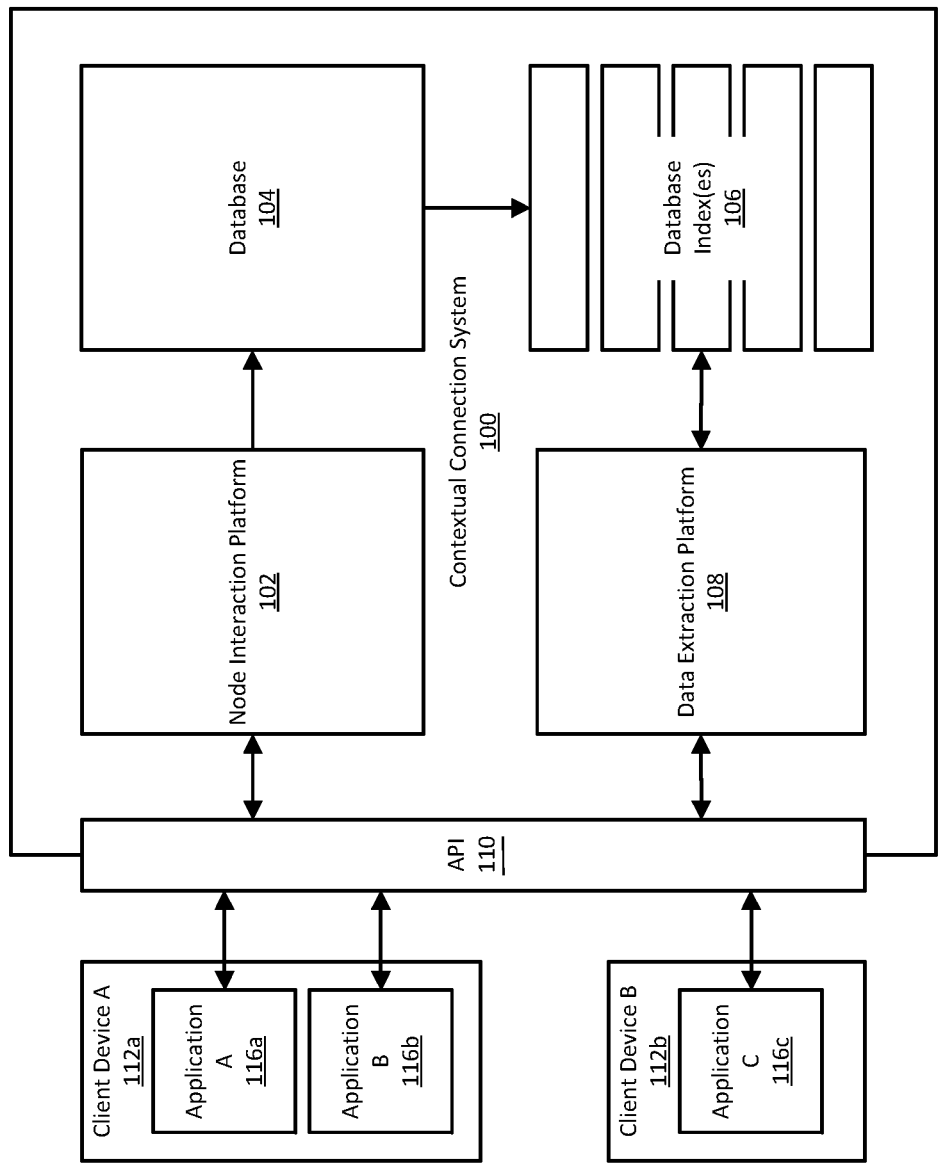
FIG. 1 illustrates an example of a contextual connection system that can be used to conduct contextual searches.

Contextually relevant search results can provide an individual who requested the search with data that can be more useful. When the search is conducted for purposes of establishing a connection between one user and another user, the search results can be more useful when the search results indicate that a connection is likely to result. Unwanted connection requests, however, are to be avoided to prevent the connection system from being misused.

Various kinds of connection systems can enable a user, represented by a node in the system, to request a connection with another user who is also represented by a node. To identify a target node to send a connection request to, the system may be configured to accept simple filter inputs, which can describe attributes that the target node should have. Though the system may be able to find nodes that match the attributes specified by the filters, finding a match may not indicate whether the target node is likely to accept a connection request. Filters may not be able to describe the interactions the target node has with other nodes, or whether those interactions indicate that the target node would be willing to accept a connection request. Additionally, the filters may not describe anything about the node that requested the search, which can also indicate whether a connection request will result in a successful connection.

The connection system may also not be configured to control the rate of connection requests, or to reduce the number of unwanted connection requests. For example, the system may allow a node to make any number of connection requests to any number of other nodes. High volumes of connection requests can unnecessarily occupy system resources, including filling request queues of nodes. Unwanted connection requests can also discourage use of the system, and thus the capacity to make connections between nodes.

In various implementations, a contextual connection system can use data collected by the system to conduct contextually relevant searches. Data can be collected from nodes and the interactions that nodes have with other nodes. Additionally, in various implementations, the contextual connection system can provide an Application Programming Interface (API), through which applications developed by others can use the system. These applications can provide additional mechanisms for generating and adding data to the system. The collected data can be stored in a database, and to make searching the database more efficient, the system can generate one or more database indexes from the data in the database. In various implementations, the database indexes can be organized so that a contextual search can be more efficient. For example, the database indexes can combine data from across tables in the database, including computing new values, to produce records that contain contextually relevant data.

In various implementations, the contextual connection system can enable an application that has registered to use the system to have access to data that may have been generated by other applications. For example, a user can be represented by one node in the system, and can use that node to access multiple applications. In this example, the user can further configure the node with access controls, which can determine the data that an application has access to.

In various implementations, the contextual connection system can also include a flow control mechanism to control the rate at which connection requests are allowed and to increase the likelihood that the connection requests will be accepted. The flow control mechanism may be able to prevent one node from issuing excessive connection requests and bogging down the system. In some implementations, the flow control mechanism can grant a node a certain number of connection credits, where a number of credits can be used to allow a connection. When the node does not have enough credits, the flow control mechanism can determine a number of tokens that can be used to allow the connection request. The number of tokens can be based data from the node requesting the connection and the node that is the target of the connection request, among other factors. Once a connection request has been allowed, the connection is successful when the target node accepts the connection.

FIG. 1 illustrates an example of a contextual connection system 100 that can be used to conduct contextual searches. In various implementations, users of various applications 116a-116c can be represented in the contextual connection system 100 as nodes. The example contextual connection system 100 includes a node interaction platform 102 through which users of applications 116a-116c can interact, through the nodes that represent the users. The interactions, as well as various other data about the nodes, the applications 116a-116c, and/or the client devices 112a-112b, can be stored in a database 104. In various implementations, the contextual connection system 100 also includes a data extraction platform 108 that enables users of the applications 116a-116c to conduct searches of the data in the database 104. To enable efficiency and a higher degree of contextual searching, the data extraction platform 108 can search one or more database indexes 106, which include data extracted from the database 104 and/or data computed form data extracted from the database 104. The contextual connection system 100 can further include an Application Programming Interface (API) 110, through which the applications 116a-116c can communicate with the contextual connection system 100.

Applications that use the contextual connection system 100 can be executing on client devices 112a-112b. A client device is a computing system that includes one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The client devices 112a-112b can be configured to execute applications 116a-116c. Applications, which are sometimes referred to as "apps," are computer programs that, when executing, can perform a set of functions. The term "application," in this context, commonly refers to programs intended for use by the users of a client device; that is, applications commonly execute in user space as opposed to kernel space, and applications exclude kernel-level programs such as operating systems and non-user-facing programs such as drivers. Examples of applications include word processing applications, spread sheet applications, web browsing applications, email applications, and so on. Some example applications can provide functions oriented around an interest, such as hiking or job searching. Some example applications can provide functions for social media interactions, including functions enabling networking, dating, microblogging, photo sharing, and/or connecting users in other ways.

Applications can be related or unrelated. Related applications, as referred to herein, are applications provided by the same publisher. In some examples, because the publisher controls the servers and/or databases that service the applications (sometimes referred to as the "backend" of an application, the application itself being the "frontend") the publisher can enable the applications to share data. For example, a user of two related applications may be able to log in to both applications using the same login information, and some information the user provides in one application may be available to the other application. Unrelated applications, as referred to herein, are applications from different publishers and that do not have a shared backend. A single publisher can also publish unrelated applications.

In some examples, an entity other than the publishers of unrelated applications can provide a backend system that enables users to use one set of login credentials to log in to unrelated applications. Examples of such entities include Facebook® and Google®. In some examples, applications can push (e.g., send to) data to the external entity, and can pull (e.g., receive from) a limited amount of data, where the pulled data is often limited to data about the logged-in user. In some cases, these entities may give the applications access to the data of a subset of the users registered with these entities.

Applications can be designed to make use of data generated through other applications. Such applications can register with the contextual connection system 100, which can provide access—which is, in some cases, limited—to the data of users who are not users of the applications. Access to such data can increase awareness of an application, particularly among users whose online activity indicates that the users would be interested in using the application. Access to such data can also be used by applications to connect a user with another user who would be interested in having a connection. For these and other functions, the contextual connection system 100 can provide contextual searches, as discussed further below.

As illustrated by Application A 116a and Application B 116b, multiple, related or unrelated, applications can be available on same client device (Client Device A 112a, in the illustrated example). In the illustrated example, both Application A 116a and Application B 116b are registered with the contextual connection system 100, and thus have access to the contextual connection system 100 through the API 110. In some cases, Application A 116a and Application B 116b can both be accessing the contextual connection system 100 at the same time. In some cases, the applications may be accessing the contextual connection system 100 only when the application is actively being used. In some cases, the applications can alternatively or additionally access the contextual connection system 100 when running as a background process. Though not illustrated here, other applications, which are not registered with the contextual connection system 100, can also be available on Client Device A 112*a* and/or be executing simultaneously with Application A 116*a* and Application B 116*b*.

As illustrated by Application C 116*c*, which is available on Client Device B 112*b*, applications on different client devices can access the contextual connection system 100 at the same time or at different times. Application C 116*c* can be the same application as Application A 116*a* or Application B 116*b*, or can be a different application. In the illustrated example, Application C 116*c* has also registered with the contextual connection system 100, and can access the contextual connection system 100 through the API 110.

In various implementations, the client devices 112*a*-112*b* can communicate with the contextual connection system 100 over a network. The network can include private and/or public networks, where the public networks can include the Internet. In these and other implementations, the contextual connection system 100 can be hosted by a computing system, such as a networked server or group of servers. In some cases, the contextual connection system 100 can be hosted by a data center.

The API 110 can enable the applications 116*a*-116*c* access to the contextual connection system 100 in a controlled fashion. An API, in this context, is a set of commands that one program can use to access another. An API can adhere to a standard, so that the set of commands follow known and well-understood formats. An API can also provide a level of security, in that access to a program may only be available through the API. Additionally, the API can be configured to monitor calls to the API to detect possible security infractions.

In various implementations, the node interaction platform 102 provides one set of functions for applications registered with the contextual connection system 100. As discussed further below, nodes in the node interaction platform 102 can record user interactions with an application 116*a*-116*c*; interactions between nodes; any data the user manually enters into the node; data automatically collected from the applications 116*a*-116*c*, client devices 112*a*-112*b*, the API 110; the node interaction platform 102; and/or other systems in the contextual connection system 100. The node interaction platform 102 can record the data in the database 104. A user's interactions with different applications 116*a*-116*c* and/or on different client devices 112*a*-112*b* can be captured by the user's node in the node interaction platform 102. As discussed further below, an application's access to the node data may be unrestricted, somewhat restricted, or very restricted.

The database 104 can be organized such that storage of the data collected in the node interaction platform 102 is efficient. As discussed further below, the database 104 can be organized in tables that are configured according to the data being stored. For management of the database 104, in various implementations, the contextual connection system 100 can include a Database Management System (DBMS). A Database Management System can include programs that enable the contextual connection system 100 to access the database 104, manipulate data, generate reports about the data, and/or generate representations of the data, among other things. The Database Management System can be a hierarchical system, a network system, a relational system, an object oriented relational system, a graph system, or some other system. Relational Database Management Systems use Structured Query Language (SQL) to execute operations, such as inserting, searching, updating, and deleted records, on a database. Examples of relational Database Management Systems include MySQL, Oracle, Microsoft SQL Server, PostgreSQL, IBM DB2, and others.

While the database 104 may be structured for efficient addition of data from various sources in the node interaction platform 102, the database 104 may not be efficient to search, particular when many records may be needed to construct a contextual search. Thus, in various implementations, the contextual connection system 100 includes one or more database indexes 106. A database index is a data structure that can improve the speed of data retrieval from a database. The database indexes 106 can organize data from the database 104 in a structure that avoids needing to search every row in a database table or in multiple database tables. The database indexes 106 can potentially also combine or compute data from different database tables and/or columns in a database table, to enable complex searches that would be time consuming to conduct on the database 104 itself. The database indexes 106 can include copies of data from the database 104, and/or can include pointers to records in the database 104.

In various implementations, the data extraction platform 108 can use the database indexes 106 to execute searches. The data extraction platform 108 can provide searches and other functions for applications 116*a*-116*c* that have registered with the contextual connection system 100. The data extraction platform 108 can use the database indexes 106 to conduct contextual searches, so that search results can have a higher degree of relevancy to the searching node. For example, applying context to the searches can lead to a higher rate of connections between nodes. Operation of the data extraction platform 108 is discussed further below.

Figure 2:
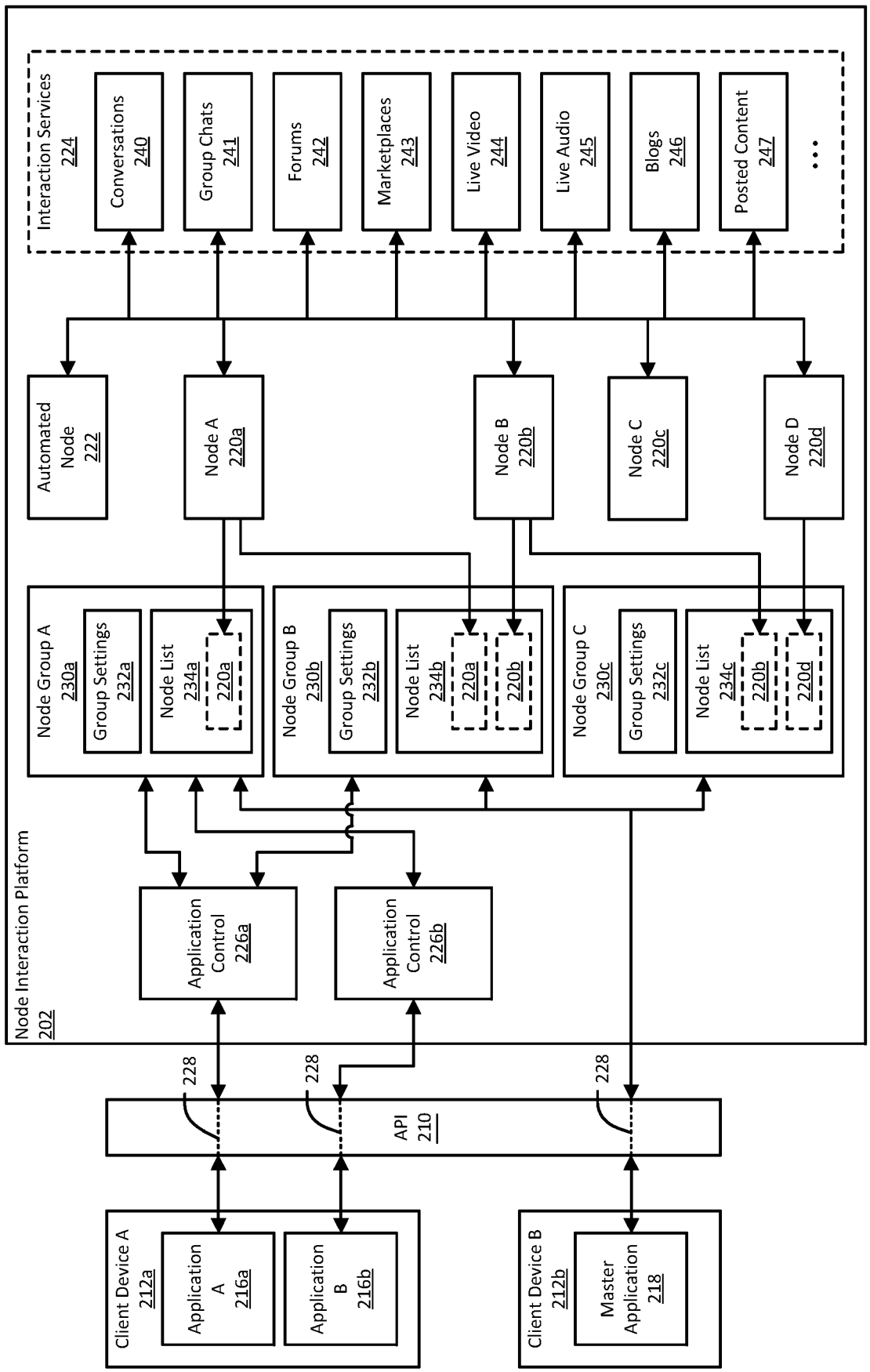
FIG. 2 illustrates in greater detail an example of a node interaction platform of a contextual connection system.

FIG. 2 illustrates in greater detail an example of a node interaction platform 202 of a contextual connection system. In various implementations, the node interaction platform 202 includes nodes 220*a*-220*d*, which can provide users with a presence within the node interaction platform 202. The nodes 220*a*-220*d* can be organized into node groups 230*a*-230*c*. The node groups 230*a*-230*c*, which can also be referred to as "audience segments," can provide applications 216*a*-216*b* with access to the nodes in the group, with some limitations on the data that is accessible by a given application. The node interaction platform 202 can enable the nodes 220*a*-220*d* to interact through various interaction services 224. Users can access the interaction services 224 through applications 216*a*-216*b* that have registered with the contextual connection system and/or through a master application 218.

Applications 216*a*-216*b* registered with the contextual connection system can be available on the same client device or on different client devices. For example, in the illustrated example, Application A 216*a* and Application B 216*b* are both available on Client Device A 212*a*. Being available, in this context, can mean that Application A 216*a* and Application B 216*b* are installed on Client Device A 212*a*, and/or that the applications can be launched from Client Device A 212*a*. Application A 216*a* and Application B 216*b* can be related or unrelated. Though not illustrated here, Application A 216*a* or Application B 216*b* can also be available on other client devices, such as Client Device B 212*b*. Other applications registered with the contextual connection system can also be available on Client Device A 212*a* and/or other client devices.

In various implementations, the applications 216*a*-216*b* can access the node interaction platform 202 through an API 210 provided by the contextual connection system. The API 210 can record API interactions 228. API interactions 228 can include calls made to the API 210 on behalf of a user of an application 216a-216b, and/or calls made to the API 210 that result from operation of an application 216a-216b. For example, API interactions 228 can include user events, such as when a user logs in, whether the user log in was successful, instructions for a user's node to use an interaction service 224 and which interaction service 224 to use, instructions for a user's node to be added or removed from a node group 230a-230c, instructions for a user's node to initiate a search or a connection request, and so on. Examples of calls made to the API 210 as a result of operation of an application 216a-216b can include connections by the application 216a-216b to the API 210, disconnects by the application 216a-216b, requests for group or node information, requests for data from the interaction services 224, the number of calls made on behalf users, the number of users using the application 216a-216b at any given time, and so on. The API interactions 228 can also include information about the client devices 212a that is accessible to the applications 216a-216b, such as, for example, geolocation data (e.g., the client device's location, obtained, for example, using the Global Positioning System (GPS)), a network location (e.g., a domain name, domain address, IP address, etc.), device identification (e.g., a device type, manufacturer, Media Access Control (MAC) address, etc.), a device hardware and/or software configuration (e.g., the device's processor, which operating system is running on the device, etc.), and so on. In some cases, individual pieces of data in the API interactions 228 can include time and date stamps.

The applications 216a-216b can be developed, published, and/or managed by different entities, including entities other than the contextual connection system. Thus, in various implementations, the API 210 can include functions for authenticating an application 216a-216b with the contextual connection system. Authentication can include determining whether the application 216a-216b has registered with the contextual connection system and is authorized to access the contextual connection system. Registering an application 216a-216b can include establishing an application control 226a-226b for the application 216a-216b. In various implementations, the application control 226a-226b can include an authentication client. In these implementations, whenever a copy of an application 216a-216b establishes a connection with the contextual connection system, the authentication client can verify whether the application 216a-216b is the same as the application 216a-216b that originally registered with the contextual connection system. In various implementations, the authentication client can also verify that an application 216a-216b is accessing the contextual connection system in a legitimate manner, and is not attempting malicious activities. In some implementations, registering an application can also include specifying a list of nodes to which the application 216a-261b can have access.

In various implementations, the API 210 can alternatively or additionally include functions for authenticating users who log in to the applications 216a-216b. In various implementations, the login credentials for users of the contextual connection system are stored and managed in the nodes 220a-220d that are provided in the contextual connection system for each user. Because the applications 216a-216b can be from other entities, when a user logs in to an application 216a-216b, the application 216a-216b can be given authorization to access the user's node 220a-220d. Such authorization can occur without the user needing to provide a username and/or password to the application 216a-216b. For example, in some implementations, when the user requests to log in to, for example, Application A 216a, the application can send an authorization request through the API 210 to the application's application control 226a. In some cases, the user may receive a request (e.g., through email, instant message, text message, a pop-up window, the master application 218, or some other mechanism) through which the user can authorize Application A 216a to access the user's node in the contextual connection system.

Once the application control 226a has verified that Application A 216a has permission to access the user's node, the application control 226a can issue a security token to Application A 216a, where the security token is tied to the user's node and/or to the application. In various implementations, the security token identifies the node, the application that requested the security token, and/or the node groups associated with the application. In some implementations, the security token may only identify node groups that were associated with the node group at the time the security token was generated. In some implementations, the node groups identified by the security token can be dynamically populated when the security token is used. In these implementations, the node groups can include all current node groups associated with the application.

Once Application A 216a has a security token for the user, whenever the user logs in to Application A 216a, the application can use the user's security token to authenticate the user with the contextual connection system. In some cases the security tokens may expire after some time. In some cases, the security tokens automatically renew when the user uses the application that has the security token. Examples of systems for authenticating users and/or applications include Open Authorization (OAuth) 1.0 and OAuth 2.0.

In addition to authentication operations, in various implementations, the application controls 226a-226b can also provide each application 216a-216b with a presence in the node interaction platform 202. The application controls 226a-226b can provide the applications 216a-216b with access to the node groups 230a-230c, and, through the node groups 230a-230c, access to the nodes 220a-220d. For example, the application controls 226a-226b can manage authentication of the applications 216a-216b and/or users that log in to the applications 216a-261b. In various implementations, the application controls 226a-226b can record information for the corresponding applications 216a-216b, such as usage statistics (e.g., the number of users using the application 216a-216b at any given time and/or over designated periods of time; times of day the application 216a-216b is used most often or less often, geographic locations where the application is used, number of successful and unsuccessful log ins, and so on).

In various implementations, the application controls 226a-226b can also include a suite of functions for use by an application 216a-261b. For example, the application controls 226a-226b can include functions for generating new nodes on behalf of new users. As another example, the functions can include functions for generating a new node group, finding existing node groups 230a-230c, attaching the application to an existing node group 230a-230c, and/or other group management functions, such as setting access controls, moderating nodes in group, banning nodes from a group, and so on. The application controls 226a-226b can further provide infrastructure that can enable an application 216a-216b to provide interaction services 224. For example, the developer of Application A 216a can decide to provide a forum through Application A 216a. In this example, Application A 216a can instruct the corresponding application control 226a to enable a forum. In this example, the application control 226a can provide management of postings, message threads, users registered to use the forums, and other operations related to running a forum. The application control 226a can further provide an interface template, which the developer can customize and install in Application A 216a. Once enabled, the forum interface can automatically connect to the forum interaction service 224 operating in the application control 226a.

In various implementations, the application controls 226a-226b can further manage attachment of interaction data generated through interaction services 224 to the nodes 220a-220d that were involved in interaction. For example, if Node A 220a and Node B 220b both took part in a forum thread on a forum provided by Application A 216a, then the application control 226a for Application A 216a can associate the forum thread with both Node A 220a and Node B 220b. Associate, in this example, can mean that the forum thread is tagged with identifiers for both Node A 220a and Node B 220b, that an identifier for the forum thread is added to the data for both Node A 220a and Node B 220b, and/or a copy of the forum thread is added to the data for both Node A 220a and Node B 220b. In this example, in some implementations, the forum thread can also be tagged with an identifier for Application A 216a, to indicate that the forum thread was generated through interactions with Application A 216a.

In various implementations, the contextual connection system can also be accessed through a master application 218. In various implementations, the master application 218 is an application provided specifically for accessing the contextual connection system, and thus may not need to be authenticated with the contextual connection system. Additionally, users who have nodes in the contextual connection system can log in through the master application 218, for example by providing a username and password, and without needing to be authenticated. In various implementations, the master application 218 operates as a frontend for the contextual connection system, and thus can have access to all node groups 230a-230c and can have visibility to all nodes 220a-220d (subject to access restrictions configured for the node groups 230a-230c or the nodes 220a-220d). All users that have a node 220a-220d in the node interaction platform 202 are automatically users of the master application 218, and thus can log in to the master application 218 and use the contextual connection system through the master application 218. In various implementations, the master application 218 can also provide interaction services 224, which may be unassociated from any application other than the master application 218. In some implementations, the master application 218 can alternatively or additionally provide access to interaction services 224 that have been configured for a specific application 216a-216b. For example, the application 216a-216b may have made the application's interaction services 224 publically available, and thus available through the master application 218. In some examples, the master application 218 can be implemented as a website. In various implementations, the API 210 can also record API interactions 228 by the master application 218.

In various implementations, the master application 218 can provide the same functionality as is provided by the application controls 226a-226b, including generating new nodes, locating existing nodes, generating new node groups, locating existing node groups 230a-230c, associating a node with a node group, removing a node from a node group, moderating and other administrative activities for node groups, enabling interaction services 224 for a node group 230a-230c, enabling interaction services 224 that are not associated with any specific node group, and so on. In some implementations, the master application 218 may be an integrated component of the contextual connection system, and thus may not need an application control in the node interaction platform 202. In some implementations, the master application 218 may be a small, lightweight application, and thus the node interaction platform 202 may have an application control for the bulk of the operations of the master application 218.

In various implementations, the applications 216a-216b, other than the master application 218, are each associated with at least one node group 230a-230b. The node groups 230a-230b can give an application access to a node list 234a-234c, which includes the nodes 220a-220d that have joined the node group 230a-230c. Nodes that are not in the node list of particular group are not visible to an application that has attached to the node group, unless the nodes are in the node list of a different group that the application has attached to. As an example, in the illustrated example, Application A 216a (through the application control 226a for the application) has attached Node Group A 230a and Node Group B 230b to the application. In this example, Node A 220a is in the node list 234a for Node Group A 230a, and Node A 220a and Node B 220b are in the node list 234b for Node Group B 230b. Being in a node list can also be referred to as being a member of a node group. In the illustrated example, by virtue of being members of Node Group A 230a or Node Group B 230b, Node A 220a and Node B 220b are both visible to Application A 216a. Node C 220c and Node D 220d, however, are members of neither Node Group A 230a nor Node Group B 230b, and thus are not visible to Application A 216a. As a further example, in the illustrated example, Application B 216b is only associated with Node Group A 230a, and thus Node A 220a is visible to Application B 216b, but Node B 220b, Node C 220c, and Node D 220d are not.

The node groups 230a-230c that are associated with an application 216a-261b can be referred to as the application's "bubble." For example, in the preceding example, the bubble for Application A 216a includes Node Group A 230a and Node Group B 230b, and the bubble for Application B 216b includes Node Group A 230a. The bubble describes the realm of data that is available to an application. Nodes 220a-220d that are members of a node group 230a-230c may be partially or fully within the bubble, as discussed further below. Being fully in the bubble means that a node's data is accessible to the application 216a-216b, subject restrictions the node can place on the data. For example, nodes 220a-220d that are registered as users of an application 216a-216b can be fully in the bubble. Being partially in the bubble means that only some of the node's data is accessible to the application 216a-216b, over and above data that the node itself has designated as not available. For example, nodes 220a-220d that are in a node group 230a-230c that is associated with an application 216a-216b but that are not registered as users of the application 216a-216b may be only partially in the bubble.

Node groups can be oriented around a particular interest, so that nodes in the node list for a group can have interactions that are related to the interest. For example, the interest area for Node Group A 230a can be hiking, so that nodes that are interested in having interactions related to hiking can join Node Group A 230a with the expectation that interactions among the members of the group will be related to hiking. In various examples, the interactions can occur through an application 216a-261b, which, as discussed above, can provide one or more interaction services 224 as a platform for having interactions. In various implementations, the applications 216a-216b can designate interactions occurring through a specific interaction service 224 as associated with a specific node group 230a-230b. For example, Application A 216a can provide a forum to for hikers to discuss hiking-related topics. In this example, Application A 216a can designate interactions occurring in the forum as associated with Node Group A 230a, a node group for hikers, and not with Node Group B 230b, a node group for kayakers. The association can mean, in this example, that forum threads from the forum are tagged as related to Node Group A 230a.

In some implementations, an application 216a-216b may not be given the ability to associate interactions with a specific node group 230a-230c. In these implementations, for an interaction between two nodes 220a-220c, the interaction may be associated with all node groups 230a-230c that the two nodes 220a-220c are members of, or may be associated with no node groups.

As noted previously, node groups can be generated through the master application 218 or through a registered application 216a-216b. When a new application registers with the contextual connection system, the new application can locate and associate with an existing node group 230a-230c, or can generate a new node group. For example, assuming Application A 216a is a new application for hiking enthusiasts, if there is no existing node group for hiking enthusiasts, then the developer of Application A 216a can start a new node group that lists hiking as the node group's interest area. The new node group can be automatically associated with Application A 216a. Alternatively or additionally, in this example, the developer may find Node Group B 230b, whose interest area is backpacking, and may decide to associate Application A 216a with this node group. When a developer starts a new node group, in some implementations, the developer can send invitations to nodes 220a-220d that may be interested in joining the new node group, and/or can advertise the new node group through the master application 218.

When a new node group is started from the master application 218, the new node group may be unassociated from any application. In some implementations, the master application 218 may automatically initiate an interaction service 224 for the new node group, such as group chat, so that members of the new node group can interact. In this example, the group chat can be accessed using the master application 218. In some implementations, the individual who started the new group can select an interaction service 224 for the new group.

Node groups, such as Node Group C 230c in the illustrated example, can also exist without being associated with an application 216a-216b. Such a node group may exist, for example, because a developer is seeking to build an audience prior to launching an application, and/or is gauging interest in a particular topic. Alternatively or additionally, a leader of an interest group may start a node group, intending that someone else develop an application for the interest group. Alternatively or additionally, a user may have started Node Group C 230c to have a place to discuss a particular topic (e.g., hiking, job searching, PHP coding, or some other interests) among a group of like-minded users. Unattached node groups can be accessed and managed through the master application 218.

In various implementations, each node group 230a-230c can have group settings 232a-232c. The group settings 232a-232c can include, for example access controls. The access controls can control when or whether nodes 220a-220c can join the node group 230a-230c. For example, a node group 230a-230c can be closed, such that a node 220a-220c can join only by invitation or upon acceptance by the group or a group moderator. As another example, a node group 230a-230c can be open, so that any node 220a-220d can join at any time. Access controls can also dictate whether applications 216a-216b have access to the data of member nodes. For example, a node group 230a-230c may give an application 216a-216b full access to the data of any node 220a-220d that is a member of the group (subject to access limitations enabled by the node 220a-220d itself). Alternatively, as another example, the node group 230a-230c may require that a node 220a-220b register as a user of an application 216a-216b before anything other than the node's public data is available to the application 216a-216b. Alternatively or additionally, as a further example, for nodes 220a-220d that are registered with an application, a node group 230a-230c may only provide access to data from a node 220a-220d that was generated when a user registered with the application 216a-216b. Various degrees of access control that fall between the preceding examples are also possible. These and other access control may also apply to the master application 218, or other access controls may apply to the master application 218.

In various implementations, the group settings 232a-232c can also include information for member nodes, such as a listing and/or description of applications 216a-216b that have associated with the node group 230a-230c. The information can alternatively or additionally include group rules, including a description of node interactions that are allowed and not allowed, subjects that can be discussed, and/or procedures for banning nodes who do not comply with the group's rules. In various implementations, the group settings 232a-232c can also include designation of group moderators and/or a list of nodes that have been banned from joining the group.

As noted previously, the nodes 220a-220d provide a presence within the node interaction platform 202 for users of the applications 216a-216b that have registered with the contextual connection system. In various implementations, a node 220a-220d can be generated when a user generates an account with a registered application 216a-216b or through the master application 218. When an application 216a-216b generates a node 220a-220d, the node 220a-220d may be automatically added to one or more node groups 230a-230c that are associated with the application 216a-261b. For example, the application 216a-216b can designate a default node group, to which all new nodes are added. In some implementations, when a node 220a-220d is generated through the master application 218, the node 220a-220d can remain unassociated with any node group 230a-230c. In the illustrated example, Node C 220c is not associated with any node group 230a-230c, and thus the user associated with Node C 220c cannot access the node through an application 216a-216b, other than the master application 218. Once Node C 220c registers to use one of the available applications 216a-216b, Node C 220c will be added at least one node group 230a-230c that is associated with the application 216a-216b. In some implementations, the user associated with Node C 220c can select which node groups 230a-230c the node should be added to. In some implementations, the application 216a-216b may additionally or alternatively automatically decide the node groups 230a-230c to which the Node C 220c will be added. In some implementations, the applications 216a-216b can change the node groups that a node belongs to at any time.

Nodes 220a-220d can also be added to a node group 230a-230c outside of an application. For example, a user can use the master application 218 to look for node groups 230a-230c that are oriented around a particular interest (e.g., connecting job seekers with employers), and, having found such a group, can add the user's node to the group (assuming this is allowed by the node's access controls). In some implementations, the user can also decide whether any application 216a-216b that is associated with the node group 230a-230c, or that later attaches to the node group 230a-230c, can have access to the node's data. In some cases, a user can register as a user of an application 216a-216b that is associated with a node group 230a-230c that the user's node is already a member of. In these cases and in some implementations, a subset of data from the user's node may be automatically available to the application 216a-216b.

The nodes 220a-220d can maintain data for a particular user. The data can include data generated through use of interaction services 224 provided through the application 216a-216b. For example, Application A 216a may provide group chats, a forum, and a marketplace, and a user's use of these engines can be recorded in the user's node. Alternatively or additionally, a user's use of functions specific to an application 216a-216b can also be recorded in the user's node. For example, Application A 216a can be a hiking application, and can provide a user the ability to record hikes taken (e.g., a route captured by GPS, the name of a trail, the name of a park where the trail can be found, the local weather, individuals who accompanied the user, etc.), input hiking equipment owned or desired, input favorite hiking locations and/or types of trails, input desired destinations, and so on. Alternatively or additionally, Application A 216a may be able to gather information about a user that the user does not input directly. For example, Application A 216a can record the user's search history, which, in the preceding example, can include searches for hiking trails, the geographic area that the user is searching, searches for hiking equipment, and/or searches for hiking companions, among other things. As another example, Application A 216a can associate photographs taken by the user with a geolocation of Client Device A 212a when the photograph was taken. Data input by a user, such as favorites, can be referred to as manually entered data, and data collected as the user uses an application can be referred to as automatically collected data.

In various implementations, a user's presence in the node interaction platform 202 is represented by one node 220a-220d, regardless of how many applications 216a-216b the user is registered with and using. Thus, the user's node 220a-220d can include data from multiple applications 216a-216b. To enable multiple applications 216a-216b to have access to a node 220a-220d, the contextual connection system can include an authentication system, as discussed above. When a user registers with an application 216a-216b, the authentication system can give the application 216a-216b a token that is assigned to the user's node 220a-220d. In some cases, the user may be asked to authorize the application 216a-216b to have access to the node 220a-220d. This request can come from outside of the application 216a-216b, so that the user need not supply the application 216a-216b with a password. The token enables the application 216a-216b to authenticate the user with the contextual connection system when the user logs in to the application 216a-216b, without a password or other security credentials.

In some implementations, the data from different applications 216a-216b can be stored separately in a node 220a-220d. In some implementations, data from different applications 216a-216b can be stored in a node 220a-220d according to the interaction service 224 through which the data was generated. In these implementations the data may be tagged with an identifier for the application 216a-216b that was used to generate the data.

In various implementations, a node 220a-220d can be configured with general access controls over the data in the node 220a-220d, with varying degrees of refinement available. For example, a node (e.g., Node A 220a) can include a set of public data, which can be visible to any user of the master application 218 and to any application 216a-216b that associates with a node group 230a-230d that the Node A 220a is a member of. Examples of public data can include a user's name; a user's age; a city, state, and/or country where the user resides; a profession; areas of expertise; work experience or a career history; interests; goals; a profile photo; and/or any other information that the user decides to make public. As a further example, Node A 220a can include sets of semi-private data, where one set of data is public within one node group (e.g., Node Group A 230a) and not available in any other node group (e.g., Node Group B 230b). In this example, any application 216a-216b that attaches to Node Group A 230a can access the set of data that Node A 220a has made public only to Node Group A 230a.

As a further example, Node A 220a can be configured to give Application A 216a access only to data generated through Node A's use of Application A 216a. In this example, though both Application A 216a and Application B 216b are associated with Node Group A 230a, data generated by Node A 220a through use of Application B 216b would not be available to Application B 216b.

As a further example, Node A 220a can control whether Application A 216a can have access to a particular interaction. For example, Node A 220a can have an interaction with Node B 220b through Application A 216a. In this example both nodes are in Node Group B 230b, and Node Group B 230b is associated with Application A 216a, and thus Application A 216a can have access to the interaction. Node A 220a, however, can request that a security token associated with the node be configured such that Application A 216a is not given access to the interaction.

As a further example, in some implementations, Application A 216a can be configured with access controls over the data that is generated through use of the application and assigned to Node A 220a.

"Available" and "accessible," in this context, means that an application 216a-216b can use the data from a node 220a-220d to conduct operations, such as determining the demographics of users, determining usage statistics for the application 216a-216b, making recommendations to users, using the data to conduct searches among users of the application 216a-216b, and so on. Data that is not available or accessible to the applications 216a-216b effectively does not exist to the applications 216a-216b. In various implementations, the contextual connection system can also be subject to data access limitations that apply to an application 216a-216b. For example, when the contextual connection system conducts a contextual search on behalf of an application 216a-216b, the contextual connection system may be restricted to searching the data that is accessible to the application 216a-216b. In some cases, however, the contextual connection system may be able to search more data than is available to the application 216a-216b. Such cases are discussed further below.

As discussed above, applications 216a-216b can provide functions specific to the applications 216a-216b. The applications 216a-216b can also take advantage of interaction services 224 that can be enabled through the node interaction platform 202. The applications 216a-216b can implement interaction services within the application 216a-216b, instead of or in addition to using an interaction service 224 available through the node interaction platform 202, and can make data from an internal interaction service available to the node interaction platform 202.

An interaction, in this context, is a communication between two or more nodes 220a-220d, formatted to enable users associated with the nodes 220a-220d to exchange information. Examples of interactions include an email, a text-based chat session, an instant message, a forum posting, a live audio-video conversation, a live audio conversation, and so on. Examples of interaction services 224 that can be provided by the node interaction platform 202 and/or that can be implemented by an application 216a-216b include conversations 240, group chats 241, forums 242, marketplaces 243, live video 244, live audio 245, blogs 246, and posted content 247, among others.

The conversation 240 service can enable one-to-one communications between two nodes 220a-220d. Such communications can take the form of, for example, email exchanges, instant messages, live text chat sessions, and so on. Conversations can also be made one-to-many, for example when the initiating node specifies multiple recipients. The conversation can remain one-to-many. An example of a one-to-many conversation is a mailing list, where nodes on the mailing list automatically receiving messages posted to the mailing list. In a conversation, each exchange (e.g., each email, or each individual text message) can be considered one interaction.

The group chat 241 service can enable many-to-many communications. A message posted to a group chat can be viewed by all nodes that are involved in the group chat. Nodes in a group chat may not be able to restrict the nodes that can view a messages posted to the group chat (the node can revert to a conversation 240 service to achieve such a restriction). In some examples, when a node joins a group chat, the node can view all prior messages posted to the group chat or only messages posted since the node joined the group chat. In some implementations, a group chat 241 service can include audio and/or video feeds, so that the group chat can occur using audio and/or video, in addition to or instead of by text. In some cases, when a group chat is concluded, the contents can be archived or deleted. Once the group chat has been closed, the contents may be viewable only by locating or requesting the archive. In group chat, each posting to the conversation (or, in the case of a live chat, each utterance by one person) can be considered one interaction, so that the chat can be considered a series of interactions. Alternatively or additionally, the entirety of the chat session can be considered one interaction. One example of a group chat 241 service is a chat room.

The forum 242 service can also enable many-to-many communications. In some examples, in a forum, nodes can post messages to a thread, where the thread can be associated with a particular topic. For example, a node can start a new thread by posting a question, and other nodes can add to the thread by providing answers, raising related questions, making comments, and so on. Posting outside of the topic is considered improper, and can be policed by a forum moderator. Unlike a group chat, the contents of a forum can be accessed whenever a node views the forum, and can remain available unless a thread is deleted. In a forum, each posting to a thread can be considered one interaction, so that the thread is a series of interactions. Alternatively or additionally, the entire thread can be considered one interaction. Examples of forum 242 services include message boards, discussion groups, and bulletin boards, among others.

The marketplace 243 service can enable nodes to buy and/or sell items or services. A marketplace can take various forms. For example, a simple marketplace can enable nodes to post classified advertisements. In this example, a node may be able to contact a requesting node using contact information provided with the posting (e.g., an email address) or the marketplace may provide an interface for emailing the posting node. A more complex example of a marketplace can include a shopping cart and payment system, and tools that can enable items to be presented with multi-media. In a marketplace, interactions between nodes can include occurrences of nodes contacting each other about items, transactions between nodes to purchase items, payments made to a node and/or through a payment system, feedback used to rate a node within the marketplace, return of items, posting of complaints, and so on.

The live video 244 service and live audio 245 can enable nodes to conduct communications using an audio-video feed or an audio-only feed, respectively. The communication can be one-to-one, one-to-many, or many-to-many. In some implementations, the live video 244 service or live audio 245 service can include an auto-transcription service, which can use voice recognition to produce a text transcript of the conversation. In some implementations, the entire conversation, including video and/or audio recordings, can be stored. In these implementations, the recordings may be compressed, to reduce the amount of storage space needed. In some implementations, to reduce storage space needed to save the conversations, only transcripts may be stored. In a live video or audio conversation, each utterance by each individual involved can be considered one interaction. Alternatively or additionally, the entire conversation, from start to finish, can be considered one interaction.

The blog 246 service can enable a node to produce a web log, or "blog." A blog can be another form of one-to-many or many-to-many interactions, where the producing node can post messages for other nodes to read. Blogs may not require any kind of membership for nodes to be able to read the messages, though in some cases a membership may be required for a node to post comments. For a blog, interactions can take the form of a node visiting to read the blog, a node leaving a comment, and/or the producing node posting a reply to a comment, among other things.

The posted content 247 service can enable sharing of content such as photos, videos, and/or messages. The content posted by one node can be referred to as the node's "feed," and the feed may be viewable through an interface provided by the service. In some cases, other nodes can subscribe to a node's feed, and can automatically receive content that the node posts to the feed. In these cases, the received content can also be viewable using an interface provided by the service. In some cases, subscribing nodes can attach comments a posting. In some cases, receiving a posting by being subscribed to another node's feed can be considered an interaction between the subscribing node and the posting node. In some cases, when a node views another node's feed, the view can be considered an interaction between the two nodes. When a node leaves a comment for another node's posting can also be considered an interaction.

As noted above, the interaction services 224 can be provided through registered applications 216a-216b and/or through the master application 218. As also noted above, an interaction service 224 may be provided for a specific node group 230a-230b. In some implementations, a node need not be a user of an application 216a-216b (other than the master application 218), or a member of a node group 230a-230b to participate in interactions. For example, in the illustrated example, Node C 220c is not a member of any node group 230a-230b, and is also not registered with any application 216a-216b (should Node C 220c register with an application, Node C 220c will be added to at least one node group 230a-230b). In this example, Node C 220c can continue to participate in interactions through the master application 218. For example, the master application 218 can be hosting a forum for Node Group C 230c, and the forum can be configured to be public. In this example, Node C 220c may be able to view and possibly post to the forum. As another example, the node interaction platform 202 can include a conversation service in the form of a mail server, which can enable Node C 220c to exchange emails with other nodes.

In various implementations, the node interaction platform 202 can also include one or more automated nodes 222. An automated node 222, which can also be referred to as a "bot," can be a process or program that can participate in interactions with other nodes 220a-220d. For example, an automated node 222 can be configured to respond to common questions, to introduce new topics to stimulate conversation, to make periodic announcements, and so on. In these and other examples, the automated node 222 may have functionality for monitoring interactions and determining whether the automated node 222 should participate in an interaction. In some implementations, an automated node 222 can be configured for automatic moderation of an interaction service 224, where moderation can include, for example, approving new nodes who have requested to be added to a node group 230a-230c, automatically deleting outdated content, monitoring for and removing unsolicited advertising (e.g., "spam,"), and so on. In various implementations, developers of the applications 216a-216b and/or moderators of node groups 230a-230c can determine whether to enable an automated node 222.

In various implementations, an automated node 222 can maintain data for the automated node's interaction with other nodes in the same manner as do the normal nodes 220a-220c. In some implementations, however, the automated node's data can be tagged so that the data isn't included in search results.

Figure 3:
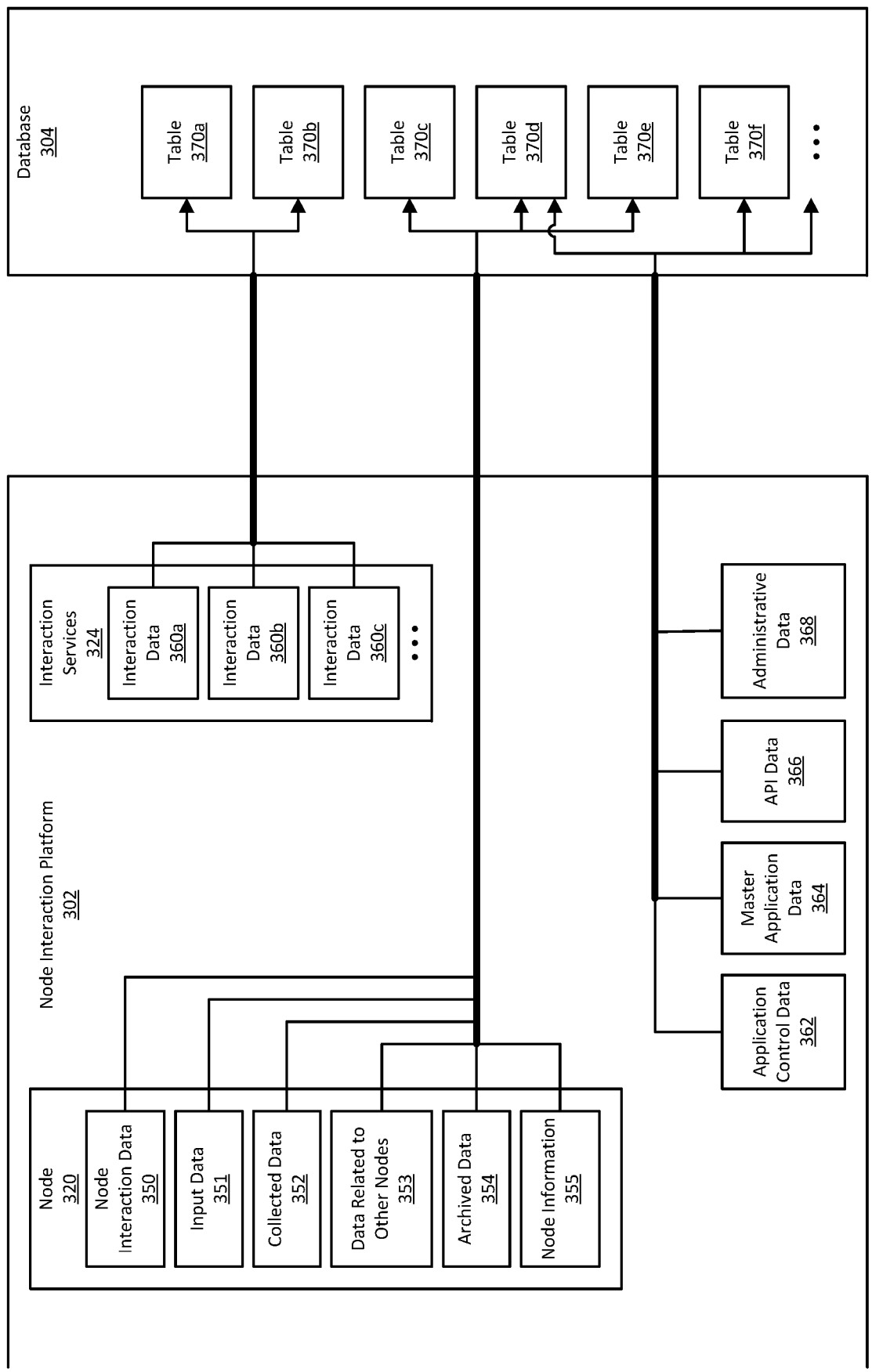
FIG. 3 illustrates various examples of data that can be collected through a node interaction platform and added to a database.

In various implementations, a node interaction platform enables nodes and applications to interact and generate data, which can then be used by a contextual connection system to conduct contextual searches. FIG. 3 illustrates various examples of data that can be collected through a node interaction platform 302 and added to a database 304. Data can be collected from nodes in the node interaction platform 302 and from interaction services 324 that are being used by applications and/or a master application. Data can also be collected from various other sources.

Examples of data that can be collected from a node 320 include node interaction data 350, input data 351, application control data 352, data related to other nodes 353, archived data 354, and node information 355, among other things.

Node interaction data 350 can include interactions the node 320 has had with other nodes. As discussed previously, these interactions can include, for example, emails, text messages, instant messages, forum posts, blog entries or comments, and so on. In various implementations, each interaction in the node interaction data 350 can be tagged with identifiers for the nodes that participated in the interaction. Each interaction can also be tagged with, for example, which node initiated the interaction, a time and/or date when the interaction occurred, whether the interaction is related to a specific node group and an identifier for the node group, whether the interaction was generated through use of an application and an identifier for the application, and/or the interaction service through which the interaction was generated, among other things. Each interaction can further include access controls, which can control whether an application and/or other nodes have access to the interaction.

Input data 351 can include data that a user has manually input into the node 320. Such data can include, for example, a profile, which can include a name, gender, age, profession, interests, a photo, interests, goals, needs, and so on. Other examples of input data 351 can include a resume or job history. The input data 351 can also include manually input data that can be used to describe other nodes. For example, a hiking application can enable a user to input the types of people the user likes to hike with. As another example, a job seeking application can enable an employer to input the types of positions and qualifications that the employer is looking for. As another example, the input data 351 can include tags assigned to other nodes and/or to interactions, such as flags for following up. As another example, the input data 351 can include sharing of interactions, which the node 320 may or may not have participated in, with other nodes and/or across applications. Input data 351 can also have access control settings, which can range from fully public to varying degrees of private.

Collected data 352 can include data that is collected as the node 320 uses an application. Such data can include, for example, a history of searches conducted by the node 320, including search strings entered, filter settings used, topics searched, and/or which results were selected from among search results. Other examples of collected data 352 include a geolocation history, which can include locations where the user has been. Geolocation data can be captured continuously and/or upon the occurrence of certain events, such as the user using an application, recording a GPS location, having an interaction, and so on. Another example of collected data 352 is a history of payments made by the node 320, where the payments to other nodes and/or to entities that are not part of the contextual connection system. The payment history can include whether the payment was made or received, identities of the parties involved in the transaction, an amount, and/or what the payment was for. Another example of collected data can include sharing history, which can include incidents where the node 320 shared or promoted the contextual connection system on websites or other services.

Data related to other nodes 353 can include, for example, a listing of nodes that the node 320 has had interactions with. In some cases, in order for two nodes to have an interaction, the two nodes must first establish a connection. In some cases, such as when a node posts to a public blog or to a forum, an explicit connection is not needed. The data related to other nodes 353 can also include lists of nodes that the node 320 has blocked, nodes that have been skipped, nodes that have been muted, and/or nodes that have been invited to use the contextual connection system and/or to join a particular node group and/or to use a particular application. Blocked nodes are nodes that the illustrated node 320 as barred from interacted with the node 32. Any connection request from a blocked node to the node 320 is automatically denied. Skipped nodes are nodes that the illustrated node 320 has previously bypassed when the skipped node appeared in a search result. Muted nodes are nodes that the illustrated node 320 has muted, where muting a node disables at least some interactions between the muted node and the node 320. For example, muted node may be unable to comment on a blog, but may still be able to instant message the node 320. Alternatively or additionally, muting can also block notifications generated through activity by the muted node, such as the muted node continuing an interaction with the node 320.

Archived data 354 can include stored copies of some or all of the data for the node 320. The archived data 354 can be used, for example, to keep historical snapshots of the node 320 as the data in the node 320 changes. For example, a profession listed in the node's input data 351 may change, and the previous profession can be preserved in the archived data 354. As another example, the list of blocked or skipped nodes can change, and the changes can be tracked in the archived data 354. As another example, the archived data 354 can include a history of geolocations over the last week, month, year, and/or for all time. In various implementations, archived data 354 can be captured upon the occurrence of an event, such as input data 351 being changed or data being added to the collected data 352. Alternatively or additionally, the archived data 354 can be collected periodically, such as once a day, once a week, every five days, or at some other interval.

The node information 355 can include any other information about the account. For example, the node information 355 can include a list of the node groups that the node 320 is a member of, a list of the applications that the node 320 is registered with, and/or security verification information, which can be used to authenticate applications that seek to access the node's data. The node information 355 can alternatively or additionally include a current status of the node 320, such as the last time the node 320 was active, whether the node 320 has connection credits available, whether the node 320 has been banned from any node groups or applications, and/or whether the node 320 is in good standing with the contextual connection system. The node information 355 can further include log files from the contextual connection system's API, which can record information such as log in attempts, failed log in attempts, and other API calls made on behalf of the node 320. The node information 355 can otherwise include any other data for the node 320 that does not fall within another category.

Data collected from the interaction services 324 can include interaction data 360a-360c for each interaction that occurred. As noted previously, an interaction can be, for example, a single message posted to a chat group and/or the entire chat session. The interaction data 360a-360c can include a message that was exchanged in the interaction and/or an unbounded number of tags. A tag can be, for example, a key-value pair. Examples of tags include an identifier for the interaction service through which the interaction occurred an identifier for the application through which the interaction occurred, the identifiers for the nodes that were involved in the interaction, an identifier for a larger interaction that encompassed the interaction, a timestamp for when the interaction occurred, a location stamp for where the interaction occurred and/or where the participants were when the interaction occurred, multimedia attached to the interaction, and so on. Other examples of possible tags include access controls that can be used to determine nodes and/or applications that can access the interaction, flags attached to the interaction and the node that attached the flag, flags indicating that indicate information such as that the interaction was abusive, and/or a public key to encrypt the message (the key can be shared with another party), among other things. In some implementations, the interaction data 360a-360c can duplicative of the node interaction data 350 collected from the node, but is organized around the interactions rather than around the node 320.

Data collected from various other sources can include application control data 362, master application data 364, API data 366, and/or administrative data 368.

The application control data 362 can include data from an application control for a particular application. The application control data 362 can include, for example, a log of API calls made by the application, a log of authentication requests made by the application, and/or a log of administrative activities by the administrator of the application, among other things.

The API data 366 can include log files from the contextual connection system's API. These log files can include a history of calls made to the API by registered applications and/or a master application.

The administrative data 368 can include data related to administration of the contextual connection system. Examples of administrative data 368 can include, for example, lists of users that have been invited to use the contextual connection system, logs recording nodes that have been added, logs recording logins through the master application, logs recording password resets, lists of banned users, lists of available node groups, logs recording node group activity, logs recording service requests, logs recording applications that have registered with the contextual connection system, logs recording administration of interaction services hosted by the contextual connection system, current uptime, current software patch levels, and so on.

In some implementations, various data collected in the node interaction platform 302 can be stored in the database 304 in a number of tables 370a-370f. In various implementations, a table 370a-370f can be structured as columns and rows. In these implementations, a row in the table can also be referred to as a record, and the columns in the row can be the values associated with the record. Data from any one source can be stored in one table 370a-370f and/or in multiple tables. Table 1 provides examples of various tables that can be included in the database 304. In the table below, denormalization is a process that attempts to improve the read performance of a database by adding redundant copies of the data or by group data.

TABLE 1

| Table | Description |
|---|---|
| api_analytics | Compiled, cached demographics about individual node groups. |
| api_apps | Records for applications that use the API. |
| api_bubbles | Records for individual node groups. |
| api_payloads | Records of API webhook payloads. |
| api_requests | Records of API requests. |
| api_shared_bubbles | Private node groups that may be shared with other developers. |
| api_tokens | API access tokens. |
| api_users | Denormalized data of nodes, the node groups that the nodes are a member of, and the applications that are associated with these node groups. |
| api_webhooks | Records of API webhooks. |
| api_writable_bubbles | Applications that automatically add nodes to specific node groups. |

TABLE 1-continued

| Table | Description |
| --- | --- |
| archived | Archived conversation flags. |
| banned | Banned IP addresses and/or flood protection. |
| bots | Records for automated nodes. |
| bubbled_conversations | Conversations denormalized by node and application. |
| conversations | Records of conversations. |
| events | Records of changes to Object Relational Mapping (ORM) objects (e.g., database records) such as conversations, nodes, applications, node groups, etc. |
| goals | Node match goals. |
| groups | Records of group chats. |
| group_messages | Records of group chat messages. |
| group_message_data | Key-value pairs coupled with access controls to attach to individual group messages. |
| group_views | Latest group message seen by each group chat participant. |
| industries | Profile industries. |
| invites | Records of users who have been invited to use the contextual connection system. |
| memberships | Group chat memberships. |
| messages | Records of conversation messages. |
| messages_bulk | Queue of bulk messages processed by cron jobs. |
| message_data | Key-value pairs coupled with access controls to attach to individual conversation message. |
| password_resets | Archive of previous password resets. |
| positions | Records of all resume data. |
| searches | Records of searches performed. |
| shares | Records of shares to other platforms. |
| skipped | Node matches skipped. |
| thumbshots | Uniform Resource Locator (URL) thumbshots. |
| tokens | Tokens for nodes to establish connections with other nodes. |
| users | Records for individual nodes. |
| user_data | Key-value pairs coupled with access controls to attach to individual nodes. |
| user_emails | Records of all emails associated with nodes. |
| user_history | Archived records of all node records at any point in time. |
| user_locations | Records of all geolocation data associated with nodes at any point in time. |
| views | Latest message seen by each conversation participant. |

The database tables can be organized so that data collected from the node interaction platform can be stored efficiently, and can be quickly retrieved for use in the node interaction platform. The tables, however, may not be organized so that contextual searches can be conducted in an efficient manner. Conducting a contextual search may require extracting multiple records from different tables, and locating each record can require a linear search. In various implementations, the contextual connection system may thus organize the data from the database in structures that can be efficiently searched for a contextual search.

In some implementations, the database can be organized as a graph database, which can include collections of nodes and the connections between the nodes.

Figure 4:
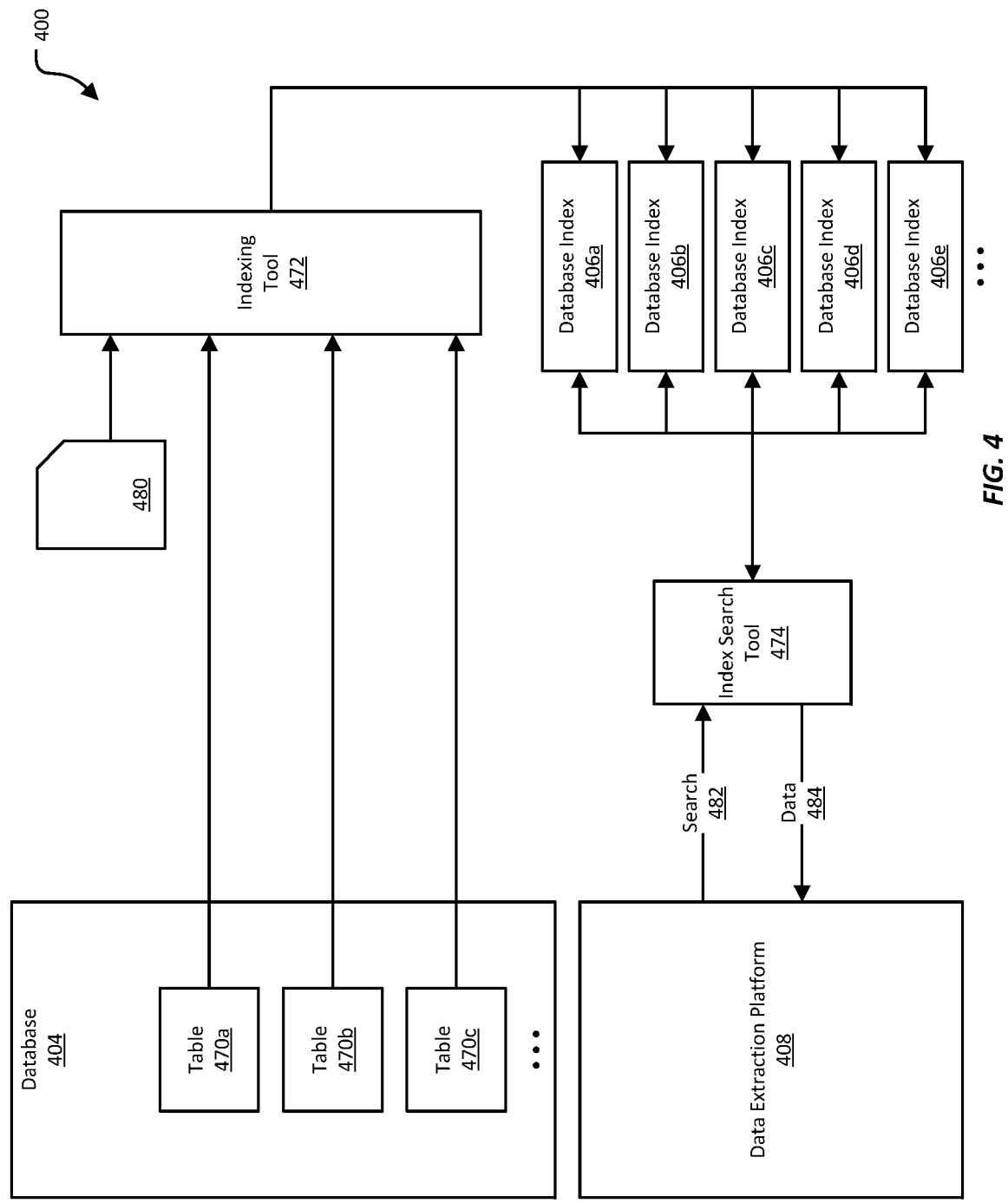
FIG. 4 illustrates an example of a process by which the contextual connection system can organize data from a database into one or more database indexes, where the database indexes can be organized for more efficient searching.

FIG. 4 illustrates an example of a process 400 by which the contextual connection system can organize data from a database 404 into one or more database indexes 406a-406e, where the database indexes 406a-406e can be organized for more efficient searching. In various implementations, the database indexes 406a-406e can be organized specifically so that a data extraction platform 408 of the contextual connection system can conduct efficient contextual searches.

In various implementations, the process 400 can include an indexing tool 472. The indexing tool 472 can take as inputs the tables 470a-470c from the database 404 and a configuration file 480, and can output one or more database indexes 406a-406e. The configuration file 480 can control the manner in which the indexing tool 472 uses the data from the database 404. For example, the configuration file 480 can dictate which tables 470a-470c to use. In some cases, the indexing tool 472 may not use all available tables.

As another example, the configuration file 480 can instruct the indexing tool 472 as to which columns from a particular table 470a-470c to extract. In some cases, only particular columns are extracted. In various implementations, the configuration file 480 can also instruct the indexing tool 472 to combine data from one table or from multiple tables, to produce columns that provide a combined perspective on the data. For example, a simple column extraction for a particular node can produce the industry in which the user associated with the node works; that is, the extraction can produce an entry whose key is "industry" and whose value is "high-technology." As a further example, a combined column extraction for a particular node can produce a list of industries for users associated with other nodes, where these nodes were extracted because the particular node has had frequent interactions with the nodes. In this example, the extraction can produce an entry whose key is "industries of nodes with frequent interactions" and which can have multiple values, such as "high-technology," "law," and "finance." Combining data can include conducting arithmetic or logical operations. Combining data can also include using graphs to determine relationships between the data and possibly making a conclusion about the data, such as occurs in a neural network. One example of an indexing tool is Sphinx.

Each database index 406a-406e can store a different set of data, organized in a particular way that is convenient for the data extraction platform 408. For example, one database index 406a can be organized around the interactions each node has with other nodes, and can have keys for the different types of interactions, the nature or content of the interactions, the participant(s) of the interaction, and so on. As another example, another database index 406b can be organized around group interactions, and can have keys for data such as a group interaction identifier, an identifier for the most recent interaction, and/or a key for all of the interactions that occurred in the group interaction, among other things. As another example, another database index 406c can be organized around node groups, and can have keys for data for the nodes that are in a particular node group, data for industries associated with nodes that are in the particular node group, data for industries targeted by nodes that are in the particular node group, and/or data recording past and/or present locations of nodes that are in the particular node group. Further examples can include a database index that organizes information about users associated with the nodes, a database index that is organized around node data, and/or a database index that is organized around interactions. The database indexes 406a-406e can include further examples.

In various implementations, the contextual connection system can include an index search tool 474 for searching the database indexes 406a-406e. The index search tool 474 can function as an interface between the data extraction platform 408 and the database indexes 406a-406e. For example, the index search tool 474 can receive a search 482 query from the data extraction platform 408. The index search tool 474 can use the search 482 query to formulate a search of the database indexes 406a-406e. The index search tool 474 can process the search results, and return the data 484 from the search to the data extraction platform 408. One example of an index search tool is provided by the Sphinx tool suite.

Figure 5:
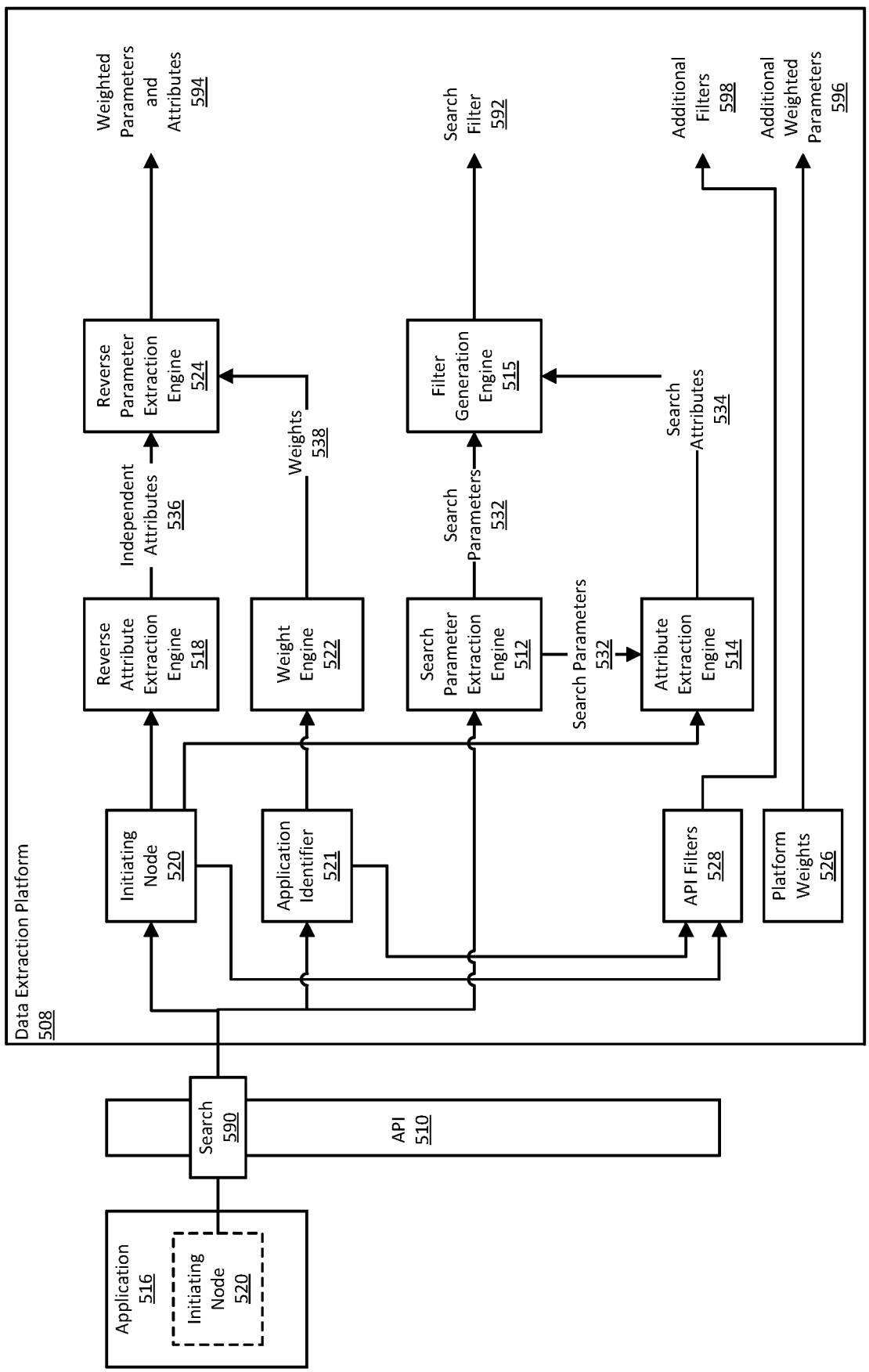
FIG. 5 illustrates in greater detail an example of a data extraction platform.

FIG. 5 illustrates in greater detail an example of a data extraction platform 508. In various implementations, nodes can use the data extraction platform 508 to search for other nodes, where the search is context relevant. Context relevant, as used herein, means that the context of a node is examined to determine whether the node is relevant to the node that initiated the search (which is referred to in the illustrated example as the initiating node 520). Relevant in this context, means that there is a high likelihood that a connection request from the initiating node 520 to a node in the search results (which may be referred to as a matching node) will result in a connection being made. As discussed further below, the likelihood can be measured by a score.

In various implementations, the initiating node 520 can initiate a search 590 from an application 516. The application 516 can be an application that has registered with the contextual connection system or can be a master application. In various implementations, the search 590 can be a function of an API 510 of the contextual connection system.

In various implementations, the search 590 can be simple or complex and structured or unstructured. A simple search 590 can be to find any and all contextually relevant nodes. A more complex search 590 can specify limits on the search 590, such as, for example, specifying a geographical location for matching nodes, or a profession, goal, or need that matching nodes must have. A structured search 590 can include the search parameters in a structured format, such as eXtensible Markup Language (XML), JavaScript Object Notation (j son), or key-value pairs, among other examples. An unstructured search 590 can include a natural language string, such as "find me someone who went to university with me who is interested in a job as a hiking guide for my meetup group."

Regardless of whether the search 590 is simple or complex, structured or unstructured, the search results are intended to be contextually relevant to the initiating node 520. Thus, in various implementations, the data extraction platform 508 can use the initiating node 520 to determine search parameters. In some implementations, the search inputs can also be delineated by the application 516 that the initiating node 520 used to initiate the search 590. Thus, in various implementations, the data extraction platform 508 can also use an application identifier 521, which identifies the application 516, to determine the search inputs.

To determine search inputs relative to the initiating node 520, in various implementations, the data extraction platform 508 can include a reverse attribute extraction engine 518. The reverse attribute extraction engine 518 can examine the initiating node 520, and determine node attributes 536 that describe the initiating node 520 and/or are relevant to the initiating node 520. For example, the node attributes 536 can describe the user associated with the initiating node 520, such as the user's profession, career history, education history, interests, goals, needs, and so on. In some implementations, the node attributes 536 can also or alternatively include lists of nodes that the initiating node 520 has skipped, banned, or muted. In some implementations, the node attributes 536 can include attributes derived from the initiating node's interaction history. For example, the reverse attribute extraction engine 518 may be able to determine that the initiating node 520 has recently had frequent interactions with web developers in general and PHP coders in particular.

In some implementations, the node attributes 536 that are extracted can be pre-determined or configured in advance. In some implementations, the node attributes 536 that are extracted can be determined from, and be related to, the application 516 from which the initiating node 520 initiated the search 590. For example, if the application 516 is an application for hiking enthusiasts, the node attributes 536 can be focused around interests, geolocation, and/or and perhaps shopping history, rather than around professional or career attributes. As another example, if the application 516 is a job seeking application, then the node attributes 536 can be focused more around work history, career goals, and/or professional interests.

In various implementations, the application identifier 521 can be used by a weight engine 522 to determine weights 538. In some cases, some search parameters may be more important within the context of the application 516 than others. For example, when the application 516 is for hiking enthusiasts, parameters such as geolocation may be more important. As another example, when the application 516 is for job seekers, parameters such as prior work experience and skills may be more important. In various implementations, the weight engine 522 can determine weights 538 for the parameters that may be relevant to the application 516, where a weight can indicate one parameter should be considered more heavily than another parameter, or the two parameters should be given equal consideration.

In some implementations, the weights 538 can be submitted by the application 516 when the search 590 is initiated. In some implementations, the weight engine 522 may determine that the application 516 has not specified weights, in which case the weight engine 522 can determine the weights 538. In some implementations, the weights 538 can be fixed by the developer of the application 516, in which case the weight engine 522 can look up the weights 538 specified by the developer. In some implementations, the weights engine 522 can use default weights.

In some implementations, the weight engine 522 can dynamically determine the weights 538 using historical usage data for the application 516. For example, the usage data may indicate frequent use of GPS tracking and very little use of professional information, in which case geolocation data may be given a higher priority than work experience. As another example, the usage data may indicate frequent browsing of resumes for high-technology professionals, in which case work history and professional skills may be given higher priority. In various implementations, the weights 538 can be expressed as a percentage, a value between zero and one, value between −1 and 1, or some other numerical range. Alternatively, the weights 538 can be expressed in a qualitative sense, such as "high importance," "medium importance," and "low importance," which can be translated to a numerical value for computations.

In some cases, the weights engine 522 may find that multiple weights 538 apply, such as weights specified by the application 516 when the search 590 is initiated and weights fixed by the developer of the application. In these cases and in some implementations, the weights engine 522 can be configured to prioritize one source of weights over another. For example, the weights specified by the application 516 may be given highest priority while weights computed using historical usage data can be given lowest priority.

In various implementations, a reverse parameter extraction engine 524 can combine the node attributes 536 and weights 538 to determine weighted parameters and attributes 594. The reverse parameter extraction engine 524 can examine the node attributes 536 from the reverse attribute extraction engine 518 and determine parameters that correspond to the node attributes 536. For example, if geolocation attributes indicate that the user associated with the initiating node 520 is almost always in Palo Alto during the weekdays and is frequently in the Santa Cruz mountains on weekends, then the reverse parameter extraction engine 524 may determine that Palo Alto is associated with a "home location" parameter and that the Santa Cruz mountains are associated with a "travels to location" parameter. As another example, if the interaction attributes indicate frequent recent interactions with PHP coders, the reverse parameter extraction engine 524 may determine that a "frequently connects with" parameter should be added to the parameters being considered.

In various implementations, the reverse parameter extraction engine 524 can further attach the weights 538 to the node attributes 536 and output weighted parameters and attributes 594. The weighted parameters and attributes 594 can include parameters that should be considered in the search, weights that should be applied to the parameters, and the attributes that should be associated with the parameters. In various implementations, the search need not be limited to the parameters provided by the weighted parameters and attributes 594, and can include other parameters. Similarly, in various implementations, the attributes in the weighted parameters and attributes 594 may be preferred, and not required.

For a simple search, the weighted parameters and attributes 594 can be used as the search inputs. When the search 590 is more complex, and has been specified with requirements and/or limitations, then, in various implementations, the data extraction platform 508 can determine search filters 592.

To determine the search filters 592, the data extraction platform 508 can use a search parameter extraction engine 512 to extract search parameters 532 from the search 590. Determining search parameters 532 can include, for example, parsing the search 590. When the search 590 is structured, parsing the search 590 can include identifying parameters specified in the search, and any attributes associated with the parameters. When the search 590 is unstructured, parsing the search 590 can include natural language processing. For example, given the search string "find me someone who went to university with me who is interested in a job as hiking guide for my meetup group," the search parameter extraction engine 512 can identify the strings "went to university with me," "interested in a job," "a job as a hiking guide," and "for my meetup group" as possible parameters for the search 590. In this example, the search parameter extraction engine 512 can associate the string "went to university with me" with the parameter "education: university" and the string "interested in a job" with the parameters "goal" and "occupation." The search parameter extraction engine 512 can further associate the string "hiking" with the parameter "interest," and the string "meetup group" with the parameter "node group."

In some cases, the attribute for a parameter can be evident from the search string. For example, in the preceding example, the attributes for the parameters "occupation" and "interest" can be determined from search string to be "hiking guide" and "hiking" respectively. In some cases, however, the search string may not provide sufficient information to determine an attribute for a parameter. In the preceding example, for instance, attributes for the parameters "education: university" and "node group" are not readily evident.

For this and other examples, the data extraction platform 508 can include an attribute extraction engine 514. The attribute extraction engine 514 can examine the initiating node 520 to determine search attributes 534 that correspond to the search parameters 532. Continuing with the previous example, the attribute extraction engine 514 can examine the initiating node 520 for resume data or an education history, and in searching for the parameter "education: university" find the attribute "New York University." The attribute extraction engine 514 can further examine the node groups that the initiating node 520 is a member of, and from among the node groups identify a node group that functions as a meetup group for PHP coders.

In various implementations, the data extraction platform 508 can combine the search parameters 532 and search attributes 534 to determine one or more search filters 592. To determine the search filters 592, the data extraction platform 508 can include a filter generation engine 515. A filter can be a parameter and one or more attributes associated with the parameter. Because a filter is a required limitation, in at least some implementations, the filter is not associated with a weight. In various implementations, the filter generation engine 515 can combine the search parameters 532 and the search attributes 534 in a structured format, such as XML, j son, key-value pairs, or a format specified by a database search tool.

In various implementations, the data extraction platform 508 can also determine API filters 528 for the search 590. In various implementations, the API filters 528 reduce the scope of a search to nodes that are accessible to the application 516. For example, the API filters 528 can determine the node groups that are associated with the application 516, so that the search can be limited to only nodes in the node groups. As another example, the API filters 528 can determine whether the initiating node 520 has authorized the application 516 to access data from the initiating node 520, and/or which specific pieces of data the application 516 is authorized to access. In various implementations, the API filters 528 can be input to an index search tool as additional filters 598. To determine the additional filters 598, in various implementations, the API filters 528 can consider data from the initiating node 520 and the application identifier 521.

In some implementations, the initiating node 520 can request an unbounded search, where unbounded means that any and all nodes within the contextual connection system can be included in the search. In an unbounded search, the additional filters 598 may be left out of the search inputs. In many cases, a registered application may not have access to unbounded searches, due to, for example, lacking authorization to access the nodes of users that have not explicitly authorized the application to access the nodes. In some implementations, unbounded searches can be available through a master application.

In various implementations, the data extraction platform 508 can also apply platform weights 526 to a search. The platform weights 526 can specify weights that are based neither on the initiating node 520 or the application 516, but rather on the manner in which the contextual connection system enables nodes to interact. For example, the platform weights 526 can assign weights to factors such as the activity level of a node (e.g., how many interactions has a node had over a recent time span), the number of successful connections made by a node, the number of connection requests made by a node, the number of times a node has been skipped, the number of times a node has been banned, and so on. In this example, factors such as the number of times a node has been skipped and the number of times a node has been banned may be given a small weight so that a large number of skips and bans reduces the overall score for a node. Conversely, the activity level and number of successful connections can be given a large weight, so that these factors can increase the overall score. In various implementations, the platform weights 526 can be expressed as a percentage, a value from zero to 0, a value between −1 and 1, or using some other numerical range. In various implementations, the platform weights 526 can be pre-configured and be periodically adjusted. In at least some implementations, the platform weights 526 are not related to any particular search 590. In various implementations, the platform weights 526 can be input to an index search tool as additional weighted parameters 596.

Figure 6A:
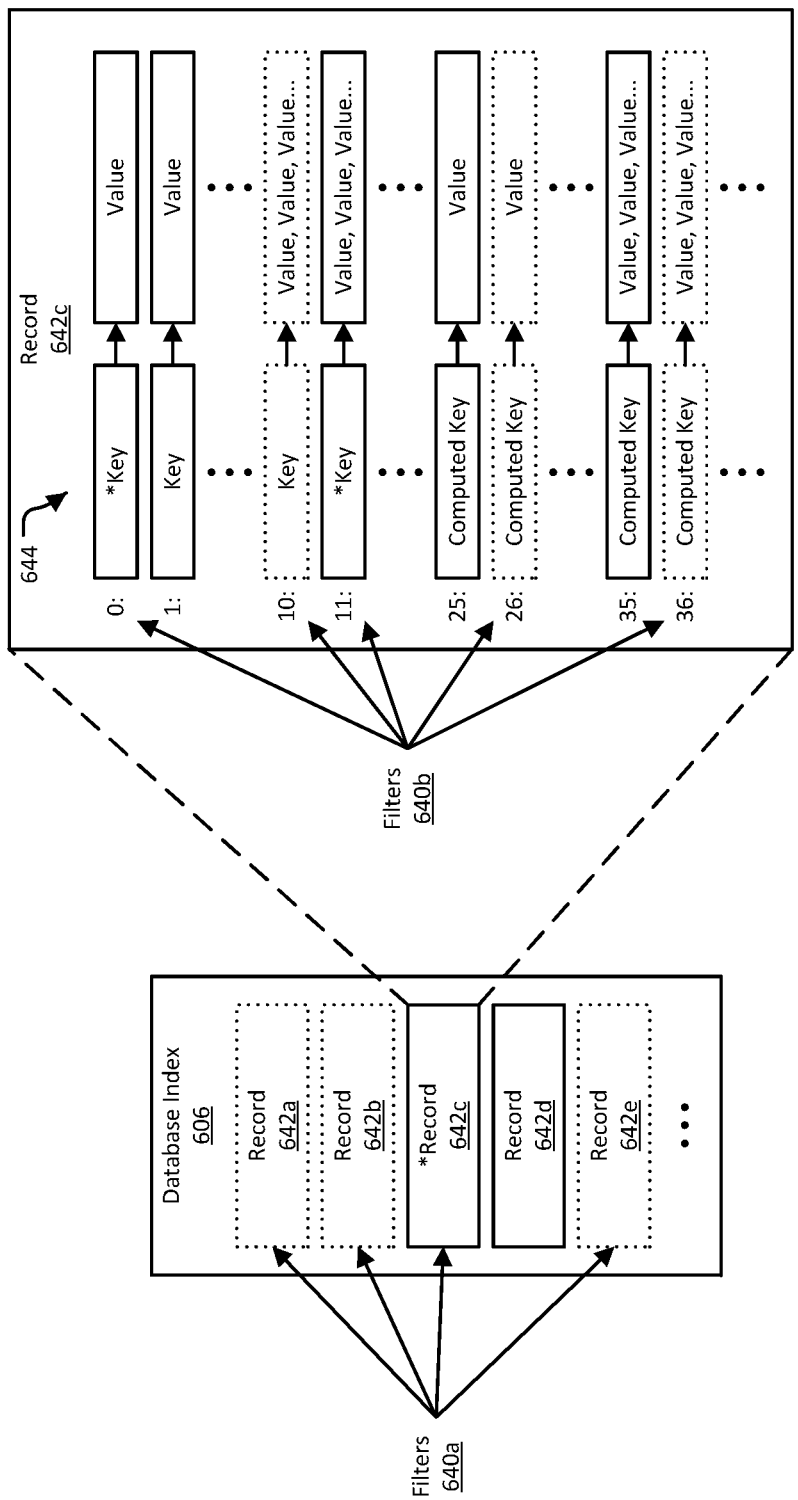
FIG. 6A-6B illustrate examples of a database index and the manner in which an index tool can apply search inputs to determine an overall score for a record in the database index.
Figure 6B:
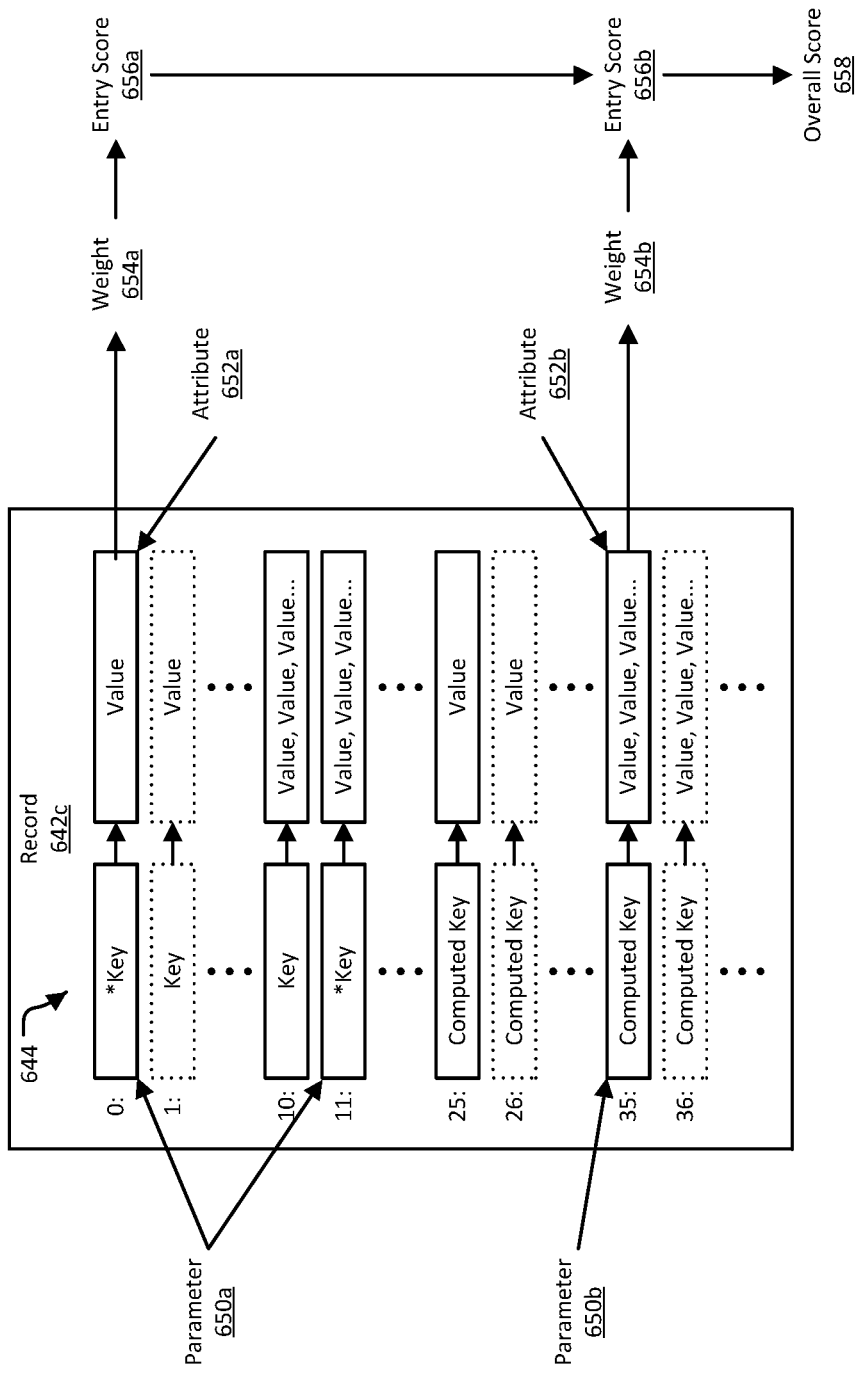

FIG. 6A-6B illustrate examples of a database index 606 and the manner in which an index tool can apply search inputs to determine an overall score 658 for a record 642c in the database index 606. As illustrated in FIG. 6A, a database index 606 can include a number of records 642a-642e. The contents of the records 642a-642e can depend on the configuration used to generate the database index 606. For example, in one database index, the records can correspond to nodes, where the records 642a-642e store data extracted from columns from one or more tables related to nodes. In other examples, a database index can include records that correspond to group interactions, or records that correspond to a node group, or records that correspond to interactions between nodes. In various implementations, the index search tool can be instructed to search one database index or to search multiple database indexes. In some implementations, the index search tool can combine the results from searching multiple database indexes. In some implementations, the index search tool can be instructed to return the individual results from searching each of multiple database indexes, which can be combined by, for example, a data extraction platform.

In various implementations, the search inputs can include a first set of filters 640a, which can apply to the records 642a-642e in the database index 606. These filters 640a can be used to exclude and/or prioritize records in the database index 606. For example, in the illustrated example, the filters 640a have resulted in Record A 642a, Record B 642b, and Record E 642e being excluded from the search, and Record C 642c being prioritized (indicated in the illustrated example by an asterisk (*)). Record D 642d may still be considered, though with a lower priority than Record C 642c.

Records can be excluded or prioritized for various reasons. For example, as noted above, the search can be initiated from an application, which is associated with one or more node groups. In this example, the filters 640a can exclude records associated with nodes that are not in any of the node groups that are associated with the application. As another example, in some cases, records for nodes that are also registered as users of the application can be given higher priority. As another example, in some cases, the filters 640a can exclude records that are associated with nodes that the initiating node has already had an interaction with.

FIG. 6A also illustrates in greater detail an example of the contents of a record 642c. In various implementations, a record can include a number of entries 644. Each entry can include a key and value, a key and multiple values, a computed key and a value, or a computed key and multiple values.

In various implementations, a key can be derived from a column that was extracted from a table. For example, given a table whose rows each store profile data for a node, a key can correspond to a column labeled "education: university." In this example, the key can be given the same label as the column. The value associated with the key can be assigned the value that can be found where a row and column intersect. In the preceding example, for instance, the value can be "New York University" for a particular node. In the illustrated example, entries 0 and 1 illustrate entries 644 that have a key and a single value.

In some cases, a key can be associated with multiple values. For example, in a table whose rows store profile data for a node, under a column labeled "profession" may be listed "computer programmer," "web developer," and "outdoor guide." Thus, in some cases, a record 642c can also include keys that are associated with multiple values. In the illustrated example, entries 10 and 11 illustrate entries 644 that include a key and multiple values.

In various implementations, a record 642c can also include computed keys. A computed key is a key whose corresponding value can include a combination of data extracted from one or more tables. For example, when the record 642c corresponds to a particular node, an entry 644 in the record 642c can describe professions of nodes that the particular node has frequent interactions with. In this example, determining the professions of nodes that the particular node has frequent interactions with can include first identifying the particular node's interactions, and determining from the nodes with which the particular node has had the most frequent interactions. This information can, for example, be extracted and computed from a table that stores interaction data. Next, the nodes with which the particular node has had the most frequent interactions can be looked up, for example, in a table that stores node profile data, to identify the professions listed for each node. The identified professions can then be stored in the record 642c, with a key that identifies the value as being combined from multiple tables. In various implementations, extracting data from different tables and combing the data can be handled by an indexing tool. In the illustrated example, entries 25 and 26 illustrate examples of entries with a computed key and value, and entries 35 and 36 illustrate examples of entries with a computed key that is associated with multiple values.

In various implementations, the search input can include a second set of filters 640b, which can apply to the entries 644 in a record 642c. The filters 640b can exclude entries 644 from consideration or prioritize entries. In the illustrated example, entries 10, 26, and 36 have been excluded, and entries 0 and 11 has been prioritized (indicated in the illustrated example by an asterisk (*)). In this example, entries 1, 25, and 26 remain in under consideration, but receive lower priority.

Exclusion of entries 644 can indicate that an entry 644 is not important, while prioritization of an entry can indicate that the entry 644 is particularly important. For example, a filter 640b can exclude a key labeled "gender," because the key is considered not important to the search. Conversely, a key labeled "geolocation" can be prioritized because the key is considered particularly important.

As discussed above, search input can also include weighted parameters and attributes. FIG. 6B illustrates an example of application of parameters 650a-650b, attributes 652a-652b, and weights 654a-654b to a record 642c in order to determine an overall score 658. The overall score 658 can indicate likelihood that the node associated with the record 642c will accept a connection request from the initiating node. For example, a high overall score 658 can indicate a high likelihood that the connection request will be accepted, while a low overall score 658 can indicate a low likelihood that the connection request will be accepted.

In various implementations, the parameters 650a-650b can be used to select entries 644 in the record 642c. In some cases, an entry can be selected because the parameter 650a-650b is the same as the key. In some cases, an entry can be selected because a parameter 650a-650b maps to the key. For example, the parameter "profession" can select an entry whose key is "profession," and also map to an entry whose key is "professions of nodes that this node has frequent interactions with." In the illustrated example, entries 0 and 11 have been selected by parameter 650a, and entry 35 has been selected by parameter 650b. In some implementations, some entries 644 may be always considered, even when the search input does not specify a parameter that selects the entry. For example, an entry indicating a number of times the node associated with the record 642c has been skipped or banned might always be considered.

In various implementations, the attributes 652a-652b indicate a value that is being sought. In some cases, and entry 644 may be selected only if an attribute 652a-652b can be found among the value or values in the entry 644. For example, in the illustrated example, entries 0 and 11 may be under consideration because the keys for these entries correspond to a first parameter 650a. In this example, only entry 0 may be selected because the attribute 652a that corresponds to the parameter 650a is found in entry 0 and not in entry 11. As also illustrated in the illustrated example, entry 35 may be selected because the attribute 652b that corresponds to a second parameter 650b can be found among the multiple values in the entry. An attribute 652a-652b is found among the value(s) in an entry when, for example, the value is similar to the attribute 652a-652b. In some implementations, a multi-value entry can have been generated to include equivalents. For example, if a node listed "outdoor guide" as a profession, then the entry can also include "hiking guide," "backpacking guide," and/or "survival guide." In this example, the attribute "hiking guide" can find a match in this entry. As illustrated by this example, the manner in which the entry was generated can cause the entry to match an attribute 652a-652b when there otherwise may not have been a match. In various implementations, similarity can mean that a value is the same as an attribute, or that the value is sufficiently similar. Whether the value and the attribute are sufficiently similar can be measured, for example, using a best matching function, such as BM25 and/or a Levenshtein distance function.

Once the parameters 650a-650b and attributes 652a-652b have been used to select entries, corresponding weights 654a-654b can be applied. In some cases, a weight 654a-654b can be combined with the value from an entry 644 to determine an entry score 656a-656b. For example, the value may be a count of the number of times the node that corresponds with the record 642c has accepted a connection request. In this example, the weight 654a-654b may be multiplied by the count to produce an entry score 656a-656b for the entry. In other cases, a weight 654a-654b can represent a value placed on the entry. For example, when a parameter and attribute specify "profession=hiking guide," one matching entry is expected to be found or not found. In this example, when a matching entry is found, the weight 654a-654b can assign a relative value to the entry; that is, the weight 654a-654b can be assigned to the entry score 656a-656b.

In various implementations, the entry scores 656a-656b can be summed to determine the overall score 658. In some implementations, the score can be normalized to a percentage or a value between zero and one hundred, or a value between zero and 1, or some other range. The record 642c and the overall score 658 can be returned in the search results. In some implementations, the record 642c may be added to the search results only if the overall score 658 is above a threshold value. Alternatively or additionally, the record 642c may be excluded from the search results when the number of records in the search results have hit a maximum number, and the overall score 658 is less than the lowest score among the records in the search results.

A goal of the search process illustrated in FIGS. 6A-6B is to locate nodes that will likely accept a connection request from the node that initiated the search (the initiating node). The nodes in the search results are thus not necessarily similar to the initiating node. Instead, the initiating node is similar to nodes that a node in the search results would connect with. Whether the node from the search results will accept a connection request from the initiating node can be measured by the score discussed above.

Figure 7:
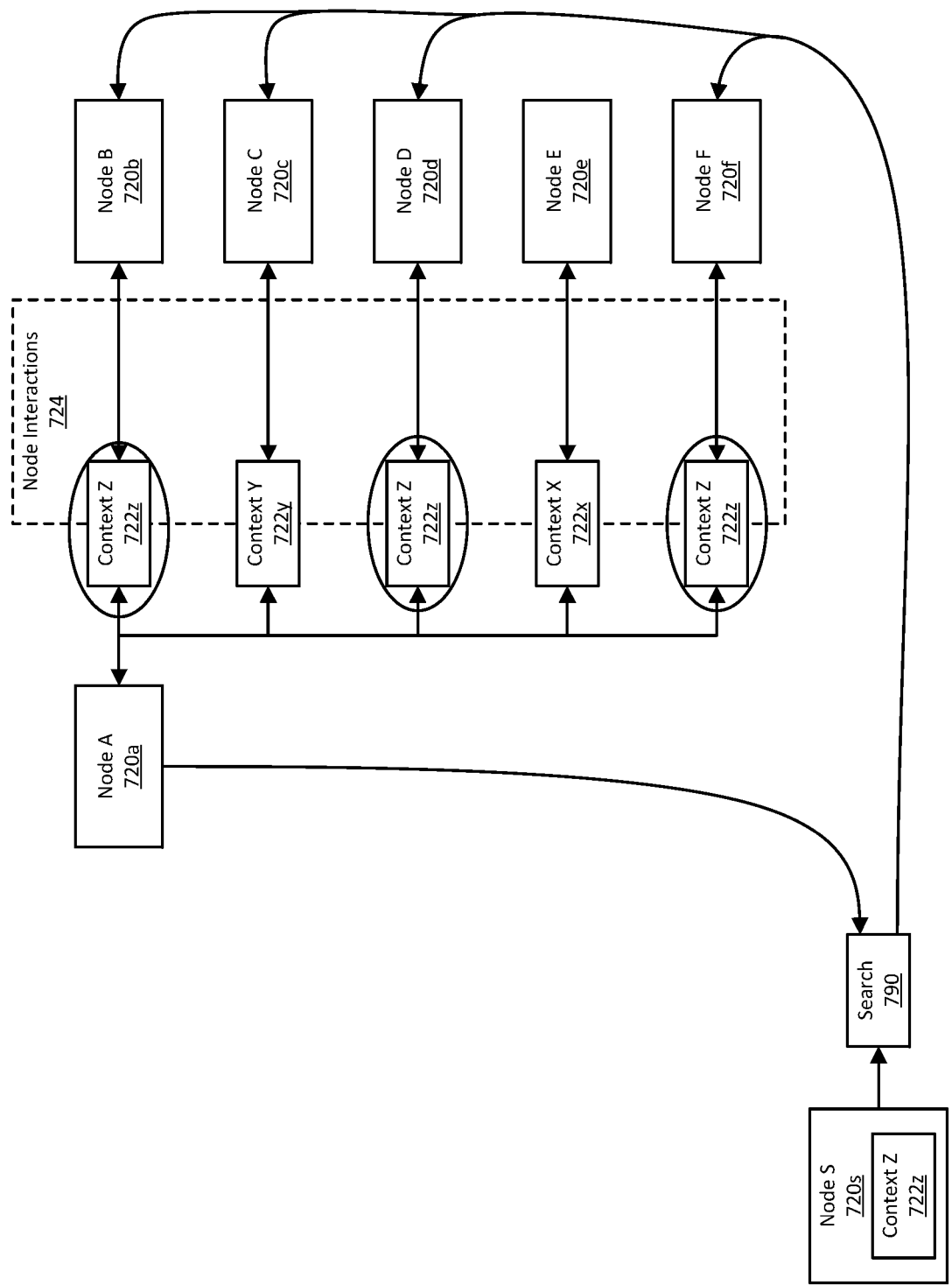

FIG. 7 illustrates an example of the relationship between an initiating node 720s, a node (Node A 720a) that is returned in search results, and nodes that Node A 720a has interacted with. It is assumed that the initiating node 720s and Node A 720a have not previously interacted, and thus may be unaware of each other. That Node A 720a is returned in the search results, however, indicates that Node A 720a is likely to accept a connection request from the initiating node 720s.

The example of FIG. 7 illustrates that Node A 720a has had node interactions 724 with five other nodes, Node B 720b, Node C 720c, Node D 720d, Node E 720e, and Node F 720f The node interactions 724 can be determined from interactions associated with Node A 720a, the node data that can be derived from five nodes, and/or from a history of interactions stored and organized according to the interactions themselves. As discussed above, the node interactions 724 can have occurred through applications that have registered with the contextual connection system, and/or through a master application. As also discussed above, the node interactions 724 can include email, instant messages, group chats, live conversations, and so on.

The node interactions 724 between Node A 720a and each of the five nodes can establish a context between Node A 720a and each node. A context here can describe topics that Node A 720a discussed with another node, a profile of Node A 720a, and/or a profile of the node with which the interactions occurred. In various implementations, the context can also include the application or applications through which the node interactions 724 occurred, node groups that the Node A 720a and the other nodes belong to, times when the node interactions 724 occurred, how recently the node interactions 724 occurred, which node initiated the first interaction, whether Node A 720a has had previous interactions with the other nodes, and other information about the node interactions 724, Node A 720a, and the other nodes.

The contexts between Node A 720a and the other nodes can be similar or different. For example, Node A 720a and Node B 720b may have discussed going on outdoor trips together and business opportunities around outdoor trips. Node A 720a may list "outdoor guide" as a profession, and Node B 720b may list "Chief Executive Office of a web startup" as a profession for Node B 720b. In this example, Context Z 722z can describe the topics discussed, the professions listed in the nodes involved in the context, as well as differences and similarities between the nodes.

As another example, Node A 720a may have discussed programming problems with Node C 720c. Node C 720c may list "web developer and programmer" as a profession. In this example, though Node C 720c may be considered to be in a similar industry as Node B 720b, because the topic discussed is different than the topic discussed in Context Z 722z, the interaction between Node A 720a and Node C 720c can be considered a different context, Context Y 722y.

As another example, Node A 720a and Node D 720d may have discussed hikes that their respective users have taken. Node D 720d may list "programmer" as a profession. The topic and nodes involved in this interaction are similar to the interaction that occurred between Node A 720a and Node B 720b. Thus, from Node A's perspective, the context between Node A 720a and Node D 720d can also be considered Context Z 722z.

As a further example, Node A 720a and Node D 720d may have discussed issues with raising children. Node D 720d may list "childcare expert" as a profession. In this example, the discussion topic is dissimilar for the discussion topics of either Context Z 722z or Context Y 722y, thus the interaction between Node A 720a and Node E 720e can be considered a different context, Context X 722x.

As a final example, Node A 720a may have discussed the outdoor industry with Node F 720f. Node F 720f may list "manager at a software company" as a profession. In this example, the topic discussed and the nodes involved are also similar to Context Z 722z. Thus, the interaction between Node A 720a and Node F 720f can also be considered Context Z 722z.

The examples discussed above illustrate three example contexts. The first context, Context Z 722z, covers discussions about outdoors, hiking, and the outdoor industry, and Node A 720a had these conversations with high-technology professionals, particularly programmers and web developers. The second context, Context Y 722y, also covers discussions with a programmer, but the topic, programming problems, was different; hence Context Y 722y may be a distinct from Context Z 722z. The third context, Context X 722x, covered a different topic entirely and was conducted with a node (Node F 720f) that had little in common with the other nodes.

What these example contexts indicate is that Node A 720a frequently discusses the outdoors with programmers and web developers, and less frequently discusses other things, such as childcare. The recurrence of Context Z 722z can be considered when initiating node 720s initiates the search process 790. For example, the search process 790 can determine that the initiating node 720s is similar to Node B 720b, Node C 720c, Node D 720d, and Node F 720f because, in this example, initiating node 720s also lists programming as a profession. As discussed above, many attributes can be considered in determining whether initiating node 720s is similar to any of these nodes.

Determining similarity between initiating node 720s and Node B 720b, Node C 720c, Node D 720d, and Node F 720f may not be enough to identify Node A 720a as a possible match result. For example, each of Node B 720b, Node C 720c, Node D 720d, and Node F 720f may have had interactions with many other nodes, about many topics. Thus, in various implementations, the search process 790 can use parameters and attributes from the initiating node 720s to determine a context to look for. Alternatively or additionally, the search process 790 can extract parameters and attributes from a search query made by the initiating node 720s. (e.g., "find me someone who is interested in a job as a hiking guide for my meetup group"). Alternatively or additionally, the search process 790 can consider the application through which the search was initiated. These parameters and attributes, with associated weights, in some cases, can be used to identify Context Z 722z as the context that initiating node 720s is looking for.

In various implementations, the search process 790 can correlate the context determined for the initiating node 720s with the nodes that the initiating node 720s is similar to. For example, the search process 790 can find that Node B 720b, Node D 720d, and Node F 720f have been involved in interactions that fall within Context Z 722z. Node C 720c can be removed from consideration or deprioritized, since the context between Node C 720c and Node A 720a is different. Based on the remaining nodes having a similar context with Node A 720a, the search process 790 can determine that Node A 720a should be added to the search results.

The example of FIG. 7 is representative of the operations that the search process 790 can conduct in identifying Node A 720a. In various implementations, the search process 790 may make the determinations illustrated in FIG. 7 directly from a record for Node A 720a. For example, the search process 790 can find a record associated with Node A 720a in a database index. In this example, from contexts stored in the record, the search process 790 can determine that the initiating node 720s is similar to nodes that Node A 720a has had frequent interactions with. In these and other examples, the identities of Node B 720b, Node D 720d, and Node F 720f may not be stored directly in the record for Node A 720a, but the similarities might be, which can enable the search process 790 to make the association between Node A 720a and the initiating node 720s.

As discussed above, whether a context associated with Node A 720a corresponds to the context that the initiating node 720s is looking for can be determined by a score. For example, the initiating node's similarity to Node B 720b, Node D 720d, and Node F 720f can be determined by a score, where, when the score is above a threshold, the nodes can be considered similar. As a further example, whether a context associated with Node A 720a is similar to the context that the initiating node 720s is looking for can be determined by a score. An overall score can determine whether Node A 720a should be added to the search results. For example, in some cases, Node A 720a is added only when the score is over a threshold.

In various implementations, other factors can be considered when the search process 790 determines whether to add Node A 720a to the search results. For example, the search process 790 may consider whether Node A 720a is a very active node, and has frequent interactions with other nodes. Frequent activity can indicate that Node A 720a is likely to accept a new connection request, and thus frequent activity can increase the score for Node A 720a. As another example, having been active recently can also increase the score for Node A 720a. As another example, the search process 790 may consider whether Node A 720a frequently accepts new connection requests, which, if true, can raise the score for Node A 720a. As another example, if Node A 720a is skipped frequently, the score for Node A 720a may be reduced. Skipping means that, when Node A 720a has appeared in a search result, the initiating node 720s (and/or any other node that has initiated a search) bypass Node A 720a when selecting a node to establish a connection with. Frequent blocking of Node A 720a can also reduce Node A's score. Blocking occurs when Node A 720a had an interaction with another node, and at some point the other node blocked Node A 720a, meaning that interactions initiated by Node A 720a will be automatically rejected by the other node. As another example, if Node A 720a lacks certain information, the score for Node A 720a can also be reduced. In these and other examples, frequency can be measured, for example by a threshold, where, when the number of occurrences is greater than the threshold, the factor can be considered frequent.

In various implementations, search results can be affected by the data that is accessible to an application. As discussed above, some data may be inaccessible because the nodes associated with the data are not in any node groups that the application is associated with and/or because nodes have made the data unavailable to an application.

Figure 8:
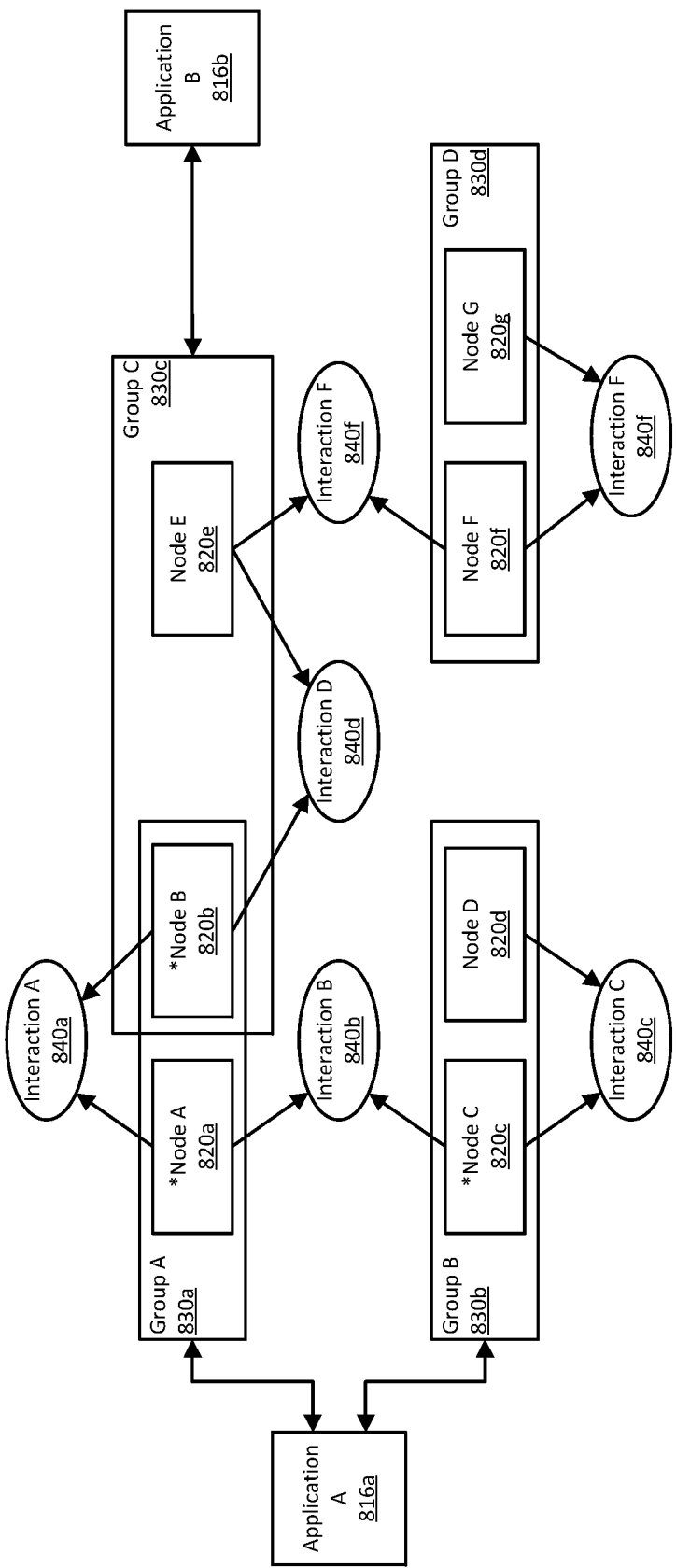
FIG. 8 illustrates some examples of associations between nodes, node groups, and applications, and the manner in which these associations can affect the data that is accessible to an application.

FIG. 8 illustrates some examples of associations between nodes, node groups, and applications, and the manner in which these associations can affect the data that is accessible to an application. The example of FIG. 8 illustrates four node groups, Group A 830a, Group B 830b, Group C 830c, and Group D 830d. Node A 820a and Node B 820b are members of Group A 830a. Node C 820c and Node D 820d are members of Group B 830b. Node B 820b and Node E 820e are members of Group C 830c. Node F 820f and Node G 820g are members of Group D 830d. Among these node groups, a first application, Application A 816a, is associated with Group A 830a and Group B 830b. A second application, Application B 816b, is associated with Group C 830c. In this example, no application is associated with Group D 830d. In this example, Application A 816a and Application B 816b are applications registered with the contextual connection system, and not a master application.

As discussed previously, the node groups that are associated with an application can delineate an application's "bubble" or the range of data that is accessible to the application. In the illustrated example, Group A 830a and Group B 830b define the bubble for Application A 816a, and Group C 830c defines the bubble for Application B 816b.

In the most general sense, data may only available to an application when the data is within the application's bubble. For example, the data of Node F 820f and Node G 820g is not accessible to either Application A 816a or Application B 816b. Similarly, Interaction F 840f between Node F 820f and Node G 820g is not accessible to either application.

In some implementations, the nodes that are outside of Application A's bubble can nevertheless be available when a contextual search is conducted through Application A 816a. For example, a profile associated with Node F 840f can be considered to determine a context between these nodes, where the context may be relevant to the search. In this example, in some implementations, data related to nodes that are outside of Application A's bubble may be deprioritized. In these implementations, Application A 816a may not be aware that nodes outside of the application's bubble have been included in a search, and may not be given access to the data of these nodes.

Within an application's bubble, whether data is accessible to the application can depend on factors such as whether a node is a user of an application, whether a node has granted the application, and/or whether a node is presently logged in to an application.

In the illustrated example, Node A 820a, Node B 820b, Node C 820c, and Node D 820d, by virtue of being in node groups that are associated with Application A 816a, are all within the range of data that is accessible to Application A 816a. In this example, Node A 820a and Node B 820b illustrate nodes that are both registered with Application A 816a and have granted Application A 816a access to their data (indicated by an asterisk (*)). Having granted this access, Application A 816a may have access to at least some data in both nodes. Node A 820a and Node B 820b also illustrate an example of an interaction, Interaction A 840a, that occurred through both nodes using of Application A 816a. Because both nodes have granted Application A 816a access to their data, Interaction A 840a may also be accessible to Application A 816a.

In the example of Node A 820a and Node B 820b, access controls for either node (controlled, for example, using security tokens) can be configured to disable Application A 816a from accessing some data from either node. For example, Node A 820a can have data that is private within Group A 830a, and thus inaccessible to Application A 816a. As another example, Node A 820a may require that the user associated with Node A 820a be logged in to Application A 816a for Interaction A 840a to be accessible to Application A 816a. In this example, when Node B 820b is logged in and Node A 820a is not, Interaction A 840a may be inaccessible to Application A 816a. As a further example, Node B 820b can use Application A 816a to assign data to Node A 820a. In this example, Node B 820b can configure this data so that any application used by Node B 820b can have access to the data (e.g., Application A 816b and Application B 816b); so that only Application A 816a has access to the data (e.g., so that nodes using Application A 816a can access the data); so that the data is only accessible to Node B 820b when Node B 820b is using Application A 816a; and/or so that the data is only accessible to Node B 820b when Node B 820b is using any application available to Node B 820b. In these and other examples, the access controls of Group A 830a may have priority over any access controls set by Node A 820a or Node B 820b.

Interaction B 840b illustrates an example of an interaction that occurred between two nodes, Node A 820a and Node C 820c, that are in different node groups. In this example, Node C 820c is also registered with Application A 816a and has authorized Application A 816a to access data in Node C 820c. Also in this example, Interaction B 840b occurred through use of Application A 816a. In this example, though the nodes involved in Interaction B 840b are in different node groups, Application A 816a may nevertheless have access to Interaction B 840b, by virtue of the interaction having occurred between two nodes that have granted Application A 816a access to their data. As in the example of Interaction A 840a, that access can be limited by either Node A 820a or Node C 820c limiting the faccess and/or requiring that one or the other node be logged in for Interaction B 840b to be accessible to Application A 816a.

Node D 820d illustrates an example where the node is within the range of data that is accessible to Application A 816a, but where the node is not registered with Application A 816a and has not granted Application A 816a access to the node's data. In this example, Application A 816a may be aware that Node D 820d exists, and may have access to some data from Node D 820d, such as fully public data. Application A 816a, however, may not have access to data from Node D 820d that requires express authorization.

An interaction, Interaction C 840c, between Node C 820c and Node D 820d may have occurred through Application A 816a, even though Node D 820d is not a registered user of Application A 816a. For example, Node D 820d may be able to receive data from the application, but not input any data. Whether Interaction C 840c is accessible to Application A 816a can depend on the authorizations granted by each node. For example, Node C 820c may granted Application A 816a access to any interaction that Node C 820c has through Application A 816a. Node D 820d, however, may deny access to any application that Node D 820d is not registered with. Because Node D 820d is not registered with Application A 816a, in some implementations, Node D's access control may take precedence.

Interaction D 840*d* illustrates an example where an interaction has occurred between a node that is in the scope of data that is accessible to Application A 816*a* (Node B 820*b*) and a node that is not within this scope (Node E 820*e*). Additionally, the interaction may have occurred through use of Application B 816*b*. In this example, in some implementations, Interaction D 840*d* may be accessible to Application A 816*a*. For example, Node B 820*b* may have granted Application A 816*a* access to any interaction Node B 820*b* has, including Interaction D 840*d*. Without this grant of access, Interaction D 840*d* would not be accessible to Application A 816*a*. In other examples, Node B 820*b* granting Application A 816*a* access to any interaction Node B 82*b* has may not grant Application A 816*a* access to Interaction D 840*d*. Access to Interaction D 840*d* can also give Application A 816*a* some knowledge about Node E 820*e*, possible as little as a node identifier or as much as Node E's public data. In most cases, this information would not be enough for Application A 816*a* to have access to, for example, Interaction E 840*e* between Node E 820*e* and Node F 820*f*.

Interaction D 840*d* and Node B 820*b* both illustrate examples of situations in which Application A 816*a* may have access to data that was generated through use of another application, Application B 816*b* in this example. For example, the user associated with Node B 820*b* may use Application B 816*b* to add data to Node B 820*b*, and/or as the user uses Application B 816*b*, this application can add data to the node. In this example, Node B 820*b* can authorize Application A 816*a* to have access to the data that was generated through the use of Application B 816*b*. Node B 820*b* can also deny Application A 816*a* access to this data. The converse can apply to Application B 816*b*, in that data added to Node B 820*b* through use of Application A 816*a* can be accessible to Application B 816*b*, if Node B 820*b* is configured to allow such access.

As noted above, whether data is accessible to an application can affect the results of search initiated through the application. For example, a search initiated through Application A 816*a* may not consider Node F 820*f* and Node G 820*g*, and thus these nodes may not be returned in the search results. Additionally, the search may be able to consider Interaction C 840*c* or Interaction D 840*d*, if Node C 820*c* and Node B 820*b*, respectively, allow so. Whether Interaction C 840*c* is considered can change the context associated with Node D 820*d*. Whether Interaction D 840*d* is considered can change the context associated with Node B 820*b*, and can affect whether Node E 820*e* is considered in the search.

The nodes found through search can be identified by the search as contextually relevant to the node that initiated the search. In various implementations, the initiating node can select from among nodes returned in a search result, and issue a connection request to the selected node. In various implementations, the initiating node can also issue connection requests to nodes discovered using other mechanisms, such as lists of nodes that can be viewed through an application, node searches provided by applications, through interaction services provided by an application, by browsing node data through a master application, and/or by using interaction services provided through the master application.

A connection request is a communication from one node to another node that requests an interaction. A connection request most often occurs between nodes that have not had a prior interaction. A connection request between nodes that have had prior interactions may be automatically allowed, in most cases. Connection requests can also be automatically accepted in other cases. For example, an unmoderated blog can allow comments to be attached to a blog entry without the commenter having to be approved in advance. In some examples, connection requests require explicit acceptance before an interaction can occur. For example, a moderated blog may require that a comment be approved by a moderator before the comment is posted.

Constant connection requests, particularly unsolicited connection requests, can be detrimental to the operation of the system. A high rate of connection requests that are rejected can unnecessarily use system bandwidth, can discourage node interactions and generation of data. Conversely, a high rate of connection requests being accepted can be conducive to increasing interactions among nodes and generation of data.

Figure 9:
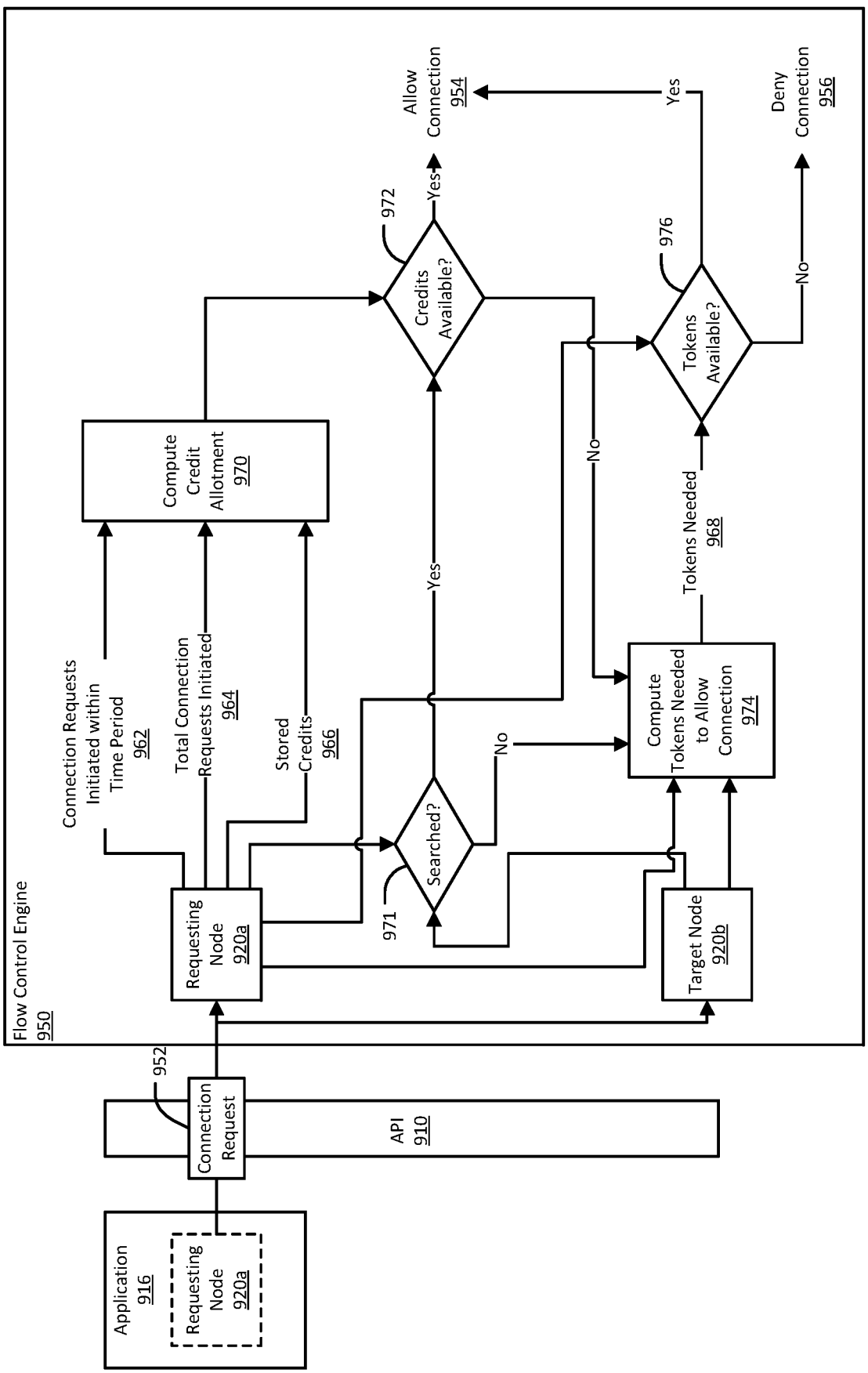
FIG. 9 illustrates an example of a flow control engine that can be included in the contextual connection system.

In various implementations, a contextual connection system can include flow control mechanisms for managing connection requests. FIG. 9 illustrates an example of a flow control engine 950 that can be included in the contextual connection system. In various implementations, the flow control engine 950 can determine whether to allow a connection 954 or deny a connection 956. A connection request 952 can be issued by a node, referred to in this example as the requesting node 920*a*. The connection request 952 can be to establish a connection between the requesting node 920*a* and another node, referred to here as the target node 920*b*. In most cases, the connection request 952 is issued from an application 916, which can be a registered application or a master application. In various implementations, the connection request 952 can be provided as function of an API 910 of the contextual connection system.

In various implementations, to determine whether to allow the connection 954 or to deny the connection 956, the flow control engine 950 can consider, at step 971, whether the requesting node 920*a* found the target node 920*b* in results returned by a contextual search. In some implementations, when the target node 920*b* was in the search results, the flow control engine 950 can consider, at step 972 whether the requesting node 920*a* has credits available to allow the connection 954. When the target node 920*b* was not in the search results, then, at step 974, the flow control engine 950 can compute the number of tokens needed to allow the connection 954. In some implementations, step 971 is optional, and the flow control engine 950 can consider whether the requesting node 920*a* has credits available or else the number of tokens needed to allow the connection 954. In some implementations, the flow control engine 950 does not use credits, and only considers the number of tokens needed to allow the connection 954.

At step 970, the flow control engine 950 can award a certain number of credits to the flow control engine 950 at certain intervals. A certain number of credits can qualify the connection request 952 to be allowed. For example, 1, 2, 5, 10 or some other number of credits can be equal to one connection request.

In some implementations, the number of credits required to make a connection can change as the requesting node 920*a* makes connection requests. For example, at the start of the time period, each connection request can require one credit, but as soon as the requesting node 920*a* has made more than, say, five connection requests within the time period, each additional connection request can require two credits. In this example, the number of credits required for connection request can continue to increase as the requesting node 920*a* makes more connection requests within the time period, where the increase can be linear or non-linear (e.g., exponential). Alternatively or additionally, as another example, when the requesting node 920*a* has not made a connection request for the last hour or last day (or some time span), the number of credits need to allow a connection can be decrease by one or two (or some other number) of increments. Alternatively or additionally, the number of credits per connection can return to one at the start of each time period.

In various implementations, at a step 970, the flow control engine 950 can compute a current credit allotment for the requesting node 920*a*. In some implementations, the flow control engine 950 can award the requesting node 920*a* a certain number of credits per a time period. The time period can be, for example, each hour, each three hours, once per day, once per 24 hour period, or some other time period. The credits granted can be added to credits not used in the previous time period. In some implementations, unused credits may expire at certain intervals. For example, credits not used in the current time period may be unavailable in the next time period. To compute the credit allotment for the time period, at step 970, the flow control engine 950 can consider, for example, connection requests initiated within a time period 962, total connection requests initiated 964, and/or stored credits 966, among other things.

The connection requests initiated within a time period 962 can include a count of how many connection requests the requesting node 920*a* has initiated with a time period. In various implementations, the connection requests initiated within a time period 962 can reduce or increase the number of credits that the requesting node 920*a* is allotted for the next time period. For example, when the requesting node 920*a* has made few connection requests in the current time period, the requesting node 920*a* may receive fewer credits in the next time period. Alternatively when the requesting node 920*a* has made many connection requests in the current time period, the requesting node 920*a* may receive more credits in the next time period. In these and other examples, the increase or decrease in the number of credits granted can be proportional to the connection requests initiated within a time period 962.

The total connection requests initiated 964 can include a count of the number of connections requests that requesting node 920*a* has ever made. The total connection requests initiated 964 can affect the credit allotment in a similar fashion as does the connection requests initiated within a time period 962. For example, when the total connection requests initiated 964 is greater than a threshold, the credit allotment granted for the time period can be reduced. In this example, the flow control engine 950 can apply multiple, increasing thresholds that, when each threshold is crossed by the total connection requests initiated 964, the credit allotment is reduced. Alternatively or additionally, the total connection requests initiated 964 can be considered together with the connection requests initiated within a time period 962. For example, the total connection requests initiated 964 may be high but the connection requests initiated within a time period 962 may indicate that the requesting node 920*a* is decreasing the rate at which the requesting node 920*a* makes connection requests. In this example, the credit allotment can be increased.

The stored credits 966 can include credits that the requesting node 920*a* has not previously used and/or has acquired by using credit acquisition tools. For example, credits that the node 920*a* does not use within the time period can be stored for later use. In some examples, unused credits are lost and not stored. One example of a credit acquisition tool is a sharing tool. In this example, whenever the requesting node 920*a* shares a link to the contextual connection system on another system or on a website, or refers to the contextual connection system on another system or website, the sharing tool can add one or more credits to the stored credits 966. Another example of a credit acquisition tool is an introduction tool. In this example, when the requesting node 920*a* introduces the contextual connection system to a new user and the new user subsequently registers with the system, the introduction tool can add one or more credits to the stored credits 966. Another example of a credit acquisition tool is an events-based tool, which can award credits when certain events occur. For example, the requesting node 920*a* may be granted a certain number of credits when the user associated with the requesting node 920*a* first registers with the contextual connection system, or when the requesting node 920*a* makes a certain number of successful connections, or when an anniversary is reached, or on particular dates, and so on. In various implementations, the number of credits awarded by a credit acquisition tool can be configured by administrators of the contextual connection system.

Having computed the credit allotment for the requesting node 920*a*, the flow control engine 950 can, at step 972, determine whether the requesting node 920*a* has sufficient credits available. When the requesting node 920*a* has sufficient credits, the flow control engine 950 can allow the connection 954 and deduct the necessary credits from the allotment When the requesting node 920*a* does not have sufficient credits, the flow control engine 950 can next determine the number of tokens that may need to be provided by the requesting node 920*a* to allow the connection. The requesting node 920*a* can add tokens to the flow control engine 950 for use when the requesting node 920*a* does not have any credits available. Tokens can be, for example, purchased from the system and/or traded for from other nodes.

At step 974, the flow control engine 950 can compute the tokens needed 968 to allow the connection request 952. The number of tokens needed 968 to allow the connection request 952 can, for example, depend on the application through which the requesting node 920*a* made the connection request. For example, when the requesting node 920*a* and the target node 920*b* are both registered with the application 916, then the number of tokens needed 968 can be zero. As another example, the identity of the application 916 can increase or decrease the number of tokens needed 968. For example, when the application 916 is a master application, the number of tokens needed 968 can be increased by a certain amount.

Alternatively or additionally, the number of tokens needed 968 to allow the connection request can depend on the requesting node's activity. For example, when the requesting node 920*a* has exhausted the credits allotted to the requesting node 920*a* for the current time period, the tokens needed 968 can be increased by a certain amount. As another example, the number of tokens needed 968 can increase for each one, two, five, or some other number of connection requests that the requesting node 920*a* makes. In this example, the amount by which the tokens needed 968 is increased can be linear or non-linear. Also in this example, the rate of increase can be limited by the time period, with the rate of increase returning to the minimum amount at the start of a new time period. As a further example, the rate of increase can drop or reset to a minimum amount when certain events occur, such as the requesting node 920*a* requesting a connection with a node found through a contextual search or the requesting node 920*a* making a successful connection.

As another example, the number of tokens needed 968 can be increased or decreased based a contextual search results obtain by the requesting node 920a. For example, when the requesting node 920b is ranked highly in search results, produced using the contextual search described above, the tokens needed 968 can be decreased by a certain amount, such as, for example, a fixed amount or an amount proportional to the target node's ranking. Alternatively, when the target node 920b is not in the search results, the tokens needed 968 can be increased by a certain amount.

Whether or not the target node 920b is in search results obtained by the requesting node 920a, in some examples, the flow control engine 950 can compare attributes from each node to determine the amount of tokens needed 968 to allow the connection request 952. For example, when the target node 920b has an attribute that is different from or conflicts with an attribute of the requesting node 920a (e.g., the listed profession for each node is different), the tokens needed 968 can be increased. As another example, when the requesting node 920a and the target node 920b have attributes that are complimentary, the tokens needed 968 can be increased (or decreased). An example of complimentary attributes can occur when the requesting node 920a has a goal that matches with an unmet need listed by the target node 920b. Another example of a complimentary attribute is the target node 920b being within a certain geographic region, such as within a certain distance from a geographic location of the requesting node 920a. The target node 920b having an attribute that is similar to an attribute of the requesting node 920a can also increase or decrease the tokens needed 968. An example of similar attributes can occur when the target node 920b has made a connection with a node that the requesting node 920a has also made a connection with. In this example, the node that both the requesting node 920a and the target node 920b have connected with can be referred to as a mutual connection. Also in this example, the number of mutual connections can increase or decrease the tokens needed 968. For example the tokens needed 968 can be increased in an amount that is inversely proportional to the number of mutual connections.

In various implementations, the number of tokens needed 968 to allow the connection 954 can also be determined from data from the target node 920b. For example, when a the target node 920b has a large amount of data, including data input into the target node 920b by the user associated with the target node 920b, data added through use of various applications, and/or data by the target node 920b having many interactions with other nodes, the tokens needed 968 can be increased. As another example, when the requesting node 920a has previously skipped the requesting node 920a, the tokens needed 968 can be increased. Skipped can mean that the target node 920b previously found the requesting node 920a through a contextual search, and did not attempt a connection request with the requesting node 920a.

In various implementations, the number of tokens needed 968 to allow the connection 954 can also depend on the number of credits that the requesting node 920a currently has. For example, when the requesting node 920a has used the node's currently available credits, then then tokens needed 968 can be increased or decreased. As another example, when the requesting node 920a has more than a certain number of available credits, the tokens needed 968 can be increased or decreased.

In some implementations, the requesting node 920a can request a return of the tokens needed 968 when the connection request 952 is rejected by the target node 920b. In these implementations, the request can result in an increase of the tokens needed 968. Alternatively or additionally, in some implementations, the requesting node 920a can receive credits when the target node 920b rejects the connection request 952, where a request to receive credits can also increase the tokens needed 968.

In various implementations, the various ways in which the number of tokens needed 968 to allow the connection request 952 can be increased or decreased can be cumulative (e.g. summed), with the final amount being at least zero or greater.

At step 976, the flow control engine 950 can determine whether the requesting node 920a has sufficient tokens available to allow the connection 954. When the requesting node 920a does not have sufficient tokens, the requesting node 920a can be prompted to add tokens. When the requesting node 920a does not add tokens, the flow control engine 950 will deny the connection 956. When the requesting node 920a has sufficient tokens, and the requesting node 920a approves use of the tokens, then the flow control engine 950 can allow the connection 954 and will deduct the tokens form the requesting node's available tokens.

In various implementations, allowing the connection request 952 means that the connection request 952 will be received by the target node 920b. In some implementations, the target node 920b can ignore or reject the connection request, or even block the requesting node 920a, where blocking can result in any future connection request from the requesting node 920a to the target node 920b being automatically denied. When the target node 920b accepts the connection request 952, the connection request can be considered successful. In some implementations, the connection request may be blocked by access controls configured for the target node 920b. In some implementations, the connection requests completes successfully, regardless of any action by the target node 920b.

In various implementations, the contextual connection system can address the problems encountered in collecting data across different types of applications and/or services to generate connections, and specifically to address the problem of differing programming languages and protocols among those applications and/or services.

In various implementations, the contextual connection system can provide an Application Programming Interface (API) through which information can be collected from a variety of different applications and/or services and, based on certain criteria, shared with users of those applications and/or services.

In various implementations, the contextual connection system can provide a computer network that includes a flow control mechanism that de-incentivizes connection requests that will be rejected, and incentivizes the user to issue connection requests to users that are actually interested in contacting the user as well, and/or are most likely to actively engage in mutually productive conversations with each other that satisfy both of their goals and interests. In various implementations, the connection requests can be sent across multiple different web or mobile applications or services. The flow control mechanism can reduce unwanted connection requests and can further reduce the processing load by limiting the amount of data sent across the network.

In various implementations, the contextual connection system can be driven by an API, which is capable of curating collections of nodes and matching them based on mutual contexts. The contextual connection system can accept and match users based on of a variety of types of data, such as, for example, user-defined data, behavioral data, as well as data acquired through third party applications. By facilitating the acquisition and sharing of data among various applications that use the API, the system can generate a network of social networking communities that can exchange information. In doing so, applications are given an opportunity to learn more about the communities that use the applications, for example by acquiring data that other communities within the network know about these communities. The amount of data that each application has access to about each user of the application can continuously grow in real-time as the network evolves. Push notifications may be sent to application clients so that all clients continuously have an up-to-date perspective of all users of the application. Applications can also be given the ability to share entire segments of each application's audience with other applications, creating a marketplace among both applications and users within the network.

In various implementations, the contextual connection system 100 can include at least three components: first, methods by which users join the system and methods in which data is collected and stored for each user node; second, methods by which matching and searching functionalities allow users find each other; and third, methods by which connections to matches are controlled.

In various implementations, a new user can be added to the contextual connection system either by logging in with a social media account or by creating new login credentials. When the user logs in using an existing social media account, in some implementations, the following data may be pulled from the social media account: a full name, an email address, a profile picture, a headline, an industry, a professional summary, a birthday, a gender, and education history, a career history, a website URL, and/or other types of user data that may be available from the social media account.

In various implementations, the user data may then be cross-referenced with any existing user nodes in the system database, to determine whether the newly acquired user data refers to the existing user. For example, a database lookup can be performed against nodes with an identical email address or social media account number. When there is no match, other factors are considered such as, for example, the new user having a similar name, geolocation, company, and/or job title as an existing user.

Once a user has a node in the database, the user can use the node to log into any application in the network. Applications are built using the public API, which includes extensive documentation.

User nodes can initially be seeded with the collected information noted above. However, each time that a user logs in, additional information can collected, such as where and when the user logged in.

In various implementations, each individual user login can map to a record in the database that notes login data, such as, for example, the user's user identifier and/or current city, region, country, latitude, longitude, and/or IP address, and/or a timestamp of the login. A geolocation database, such as, for example, the MaxMind GeoIP2 database, can be used to determine a user's city based on the user's IP address. A geolocation API, such as, for example, the HTML5 geolocation API, can be used to determine a user's coordinates. In the case of a user's coordinates being unavailable, the coordinates can default to the center of the user's current city, as defined by the GeoIP2 database (or other geolocation database).

In various implementations, a history of location data can be used to map a user's physical location over time. Such information may become a factor in the matching algorithm. For example, the system can cross-reference users who were in similar locations at similar points in time in the past, and determine a likelihood that they may have crossed paths. It is understood that a user may exist in a specific logged location from the latest point in time, earlier than the record in question, recorded from a different location, to the earliest point in time, later than the record in question, recorded from a different location.

In some implementations, each application registered with the system can have the ability to attach metadata to a specific user. Metadata are user-defined key-value pairs that can be coupled with a privacy setting. In some examples, keys may be single-word strings with a maximum length of 50 characters. In some examples, values may be an array of text-based data in which each element may be no longer than 250 characters. In various implementations, the metadata can include an unlimited amount of searchable data while also offering security against applications attempting to use the system's storage engine for binary data or to replace the applications' own long form data requirements. Privacy settings offer the ability for data to be accessible across the entire system, only to the application set settings were set by, only to the user the settings were set by, or only to the user/application combination. As a result, applications may protect information the applications define while still benefiting from the matching algorithm incorporating the applications' data.

In various implementations, the contextual connection system can include multiple audience segments (which can also be referred to as node groups). Audience segments represent a standalone collection of users. An example of an audience segment might be members of a single community or meetup group.

Each application can be self-contained in that its users only have access to each other. Applications associate with at least one audience segment, and may associate with any number of audience segments. In some implementations, there may be an upper limit to the number of audience segments that an application can associate with. An application may choose to change the audience segments that the application is associated with at any time. In some implementations, each time a user logs into an application, that user can automatically joined to one or more audience segments that the application is currently associated with. Applications may overlap when users participate across multiple applications.

Because information attached to a user follows the user across applications, there is an incentive to build a community within the system. The community can foster building a well-rounded profile for each user, which can include more data than any single application can acquire. Not only does information about users follow the users between applications, but the users' existing relationships, conversations, and behaviors with other users throughout the entire network additionally follows the users between applications. Therefore, when a user initially signs up with an application that is registered with the system, the application may already know the needs of the user, details of the user's behavior with other users defined in the same audience segment, and who to connect the user with.

For example, a single user may participate in a real estate application, which knows the user's annual household income, and a technology application, which knows the user's technical skills and expertise. Each application is now able to build a more complete picture about the user by gaining insights to other aspects of the person, access to which the applications otherwise would not have. Should the user join a career application at some point in the future, all applications already exposed to the user will immediately gain access to the career application data as well.

When user data is modified, in various implementations, web-hooks may send push notifications to application clients informing the applications of the change, in real-time. Applications can continuously have an up-to-date perspective of all users.

Administrators of audience segments may share the audience segments with application builders chosen by the administrators, so that the application builders can use the audience segments within applications of the application builders. Therefore, applications can exist that simply leverage audience segments built by others. Additionally, administrators can set privacy settings for an audience segment, such as read-only, or choose to include the audience segment in a public directory of audience segments. In some cases, administrators of audience segments may choose which application builders can have access to an audience segment. In some cases, administrators of audience segments may choose to publically list an audience segment, or allow an audience segment to be discoverable in a variety of ways. When applications have access to read-only audience segments, the applications may not be able to add any additional users to the audience segment. Conversely, when audience segments are not read-only, multiple applications may contribute to the size of the audience, increasing the pool of users available to each application that has access to the audience segment.

As noted above, in various implementations, the contextual connection system can include methods by which the matching and searching functionalities allow users to find each other.

In various implementations, the default matching algorithm can use an inverted index to retrieve user nodes. The retrieved nodes exist within the currently-defined grouping of audience segments that is used by an individual application. The retrieved nodes exclude nodes that are deactivated, nodes that are already associated with users the end-user is already in a conversation with, and nodes associated with users the end-user is currently blocking. All filtered users matching that criteria can then sorted with a ranking function, such as, for example, a modified implementation of the BM25 ranking algorithm, taking the following into consideration:

Does the headline, pitch, and/or metadata that is attached to the searching user have anything in common with data known about any of the potential matches?

Do any of the potential matches tend to have a high frequency of similar metadata keys as the searching user?

Do any of the potential matches tend to have a high frequency of metadata set by the same user as the searching user? Do the potential matches use the same application as is being used by the searching user?

Do the searching user's goals (hiring employees, seeking employment, etc.) complement the goals of any of the potential matches?

How many of the goals of the potential matches does the searching user potentially fulfill?

Are any of the potential matches in the same industry as the searching user?

Are any of the potential matches in the same industry the searching user has indicated the searching user is targeting?

Has the searching user indicated that location is important to the searching user when discovering new users?

What is the distance in miles between the searching user and the potential matches?

Is location important to the potential matches? Do the potential matches want to be connected with users not geographically relevant to them?

What is the probability that the searching user and potential matches have encountered each other, based on previous location history?

What is the probability that the searching user and potential matches have encountered each other based on their resumes? Have either the searching user or a potential match previously worked at the same company, at a company within a similar field, or attended the same school?

Have any of the potential matches previously worked at organizations of a similar size to an organization associated with the searching user? For example, do both the potential match and the searching user have experience in the enterprise space or as entrepreneurs?

Are any of the potential matches currently engaged in positions of a similar scope to the searching user? Are any of the potential matches at an organization that is similar size as an organization associated with the searching user, or in similar role (executive level, mid-level management, etc.) as the searching user?

How many years post-schooling is the searching user compared to potential matches? Do the searching user and a potential match have similar lengths of employment history or is one a new graduate while the other a seasoned veteran?

How engaged are the potential matches? How many messages and conversations have the potential matches participated in recently? What percentage of introduction requests do the potential matches respond to? How likely are the potential matches to respond to an introductory message by the searching user?

Does the searching user match the criteria of the type of user that the potential matches tend to respond to?

How many users have blocked or skipped over any of the potential matches?

On average, how many messages do the potential matches send per conversation?

What degree of separation are the potential matches from the searcher?

How many new connections has the searching user already made over the past day (or other time period)?

How big is the current audience segment?

Have any of the potential matches previously skipped over the searching user?

How much data is available about each of the potential matches?

Do the potential matches have recently verified emails? What is the likelihood that the potential matches will receive messages sent to them?

Are the potential matches currently online? When was the last time the potential matches logged in? How frequently do the potential matches log in?

What is the likelihood that the potential matches will reply to introductory messages sent to them based on the prior behavior of the potential matches?

Are any of the potential matches located in the United States, United Kingdom, Australia, or Canada? In a first-world country? In: Austria, Belgium, Brazil, China, Denmark, Finland, France, Germany, Hong Kong, Italy, Japan, Netherlands, Norway, Portugal, Singapore, South Korea, Spain, Sweden, Switzerland, Taiwan? Or any other relevant country?

Has the searching user been previously exposed to the potential matches?

It should be appreciated that the amount and type of matching criteria is not limited to that listed above, and any other types and amounts of factors may be taken into account in finding one or more matches.

For each of the above criteria, results can be sorted by assigning a weight to each factor. The top results (e.g., the top 100 results) can then be shared as the searching user's best algorithmic matches.

While the above describes the default matching algorithm, user-defined data may also be used to build customized, weighted searching and filtering algorithms. The algorithms can be designed to filter users who meet specific criteria, in addition to sorting users by assigning a weight to specific criteria. An application may build an algorithm using any combination of native user data and accessible metadata, taking into consideration the metadata's privacy settings.

In some examples, each individual field may be searched against a unique query string. By default, results can be filtered such that all words in the string must exist, unless the words are separated with "or". To perform a weighted search (as opposed to filtering), the string may be prefaced with a number from 0 to 100 (or any other suitable numbering scheme), followed by a colon, to specify the weight the search algorithm should assign to the field.

As noted above, the contextual connection system can also include a flow control mechanism, by which users can connect with their matches and ultimately engage with them through the network.

In various implementations, a small number of tokens may be requested in exchange for users introducing themselves to new connections. The number of tokens can be algorithmically determined based on the likelihood that the person being reached out to would be interested in the user who is wanting to introduce themselves. The token calculator may consider most of the factors of the default matching algorithm. In some implementations, the number of tokens can be equated with a dollar amount.

The token requirement can act as a barrier against users being solicited by those irrelevant to the users, or by users attempting to cast a very wide net. In practice, users who are messaged appreciate that the originator of the message and may want to speak with the sender, and are willing to cross some type of barrier, in order to do so. Additionally, the less likely it is that the message recipient actually is interested in what the sender might have to say, the higher the token amount becomes to reach the recipient. This methodology goes against that of traditional lead generation platforms in which the token amount is dependent on how niche the audience segment is.

Figure 10:
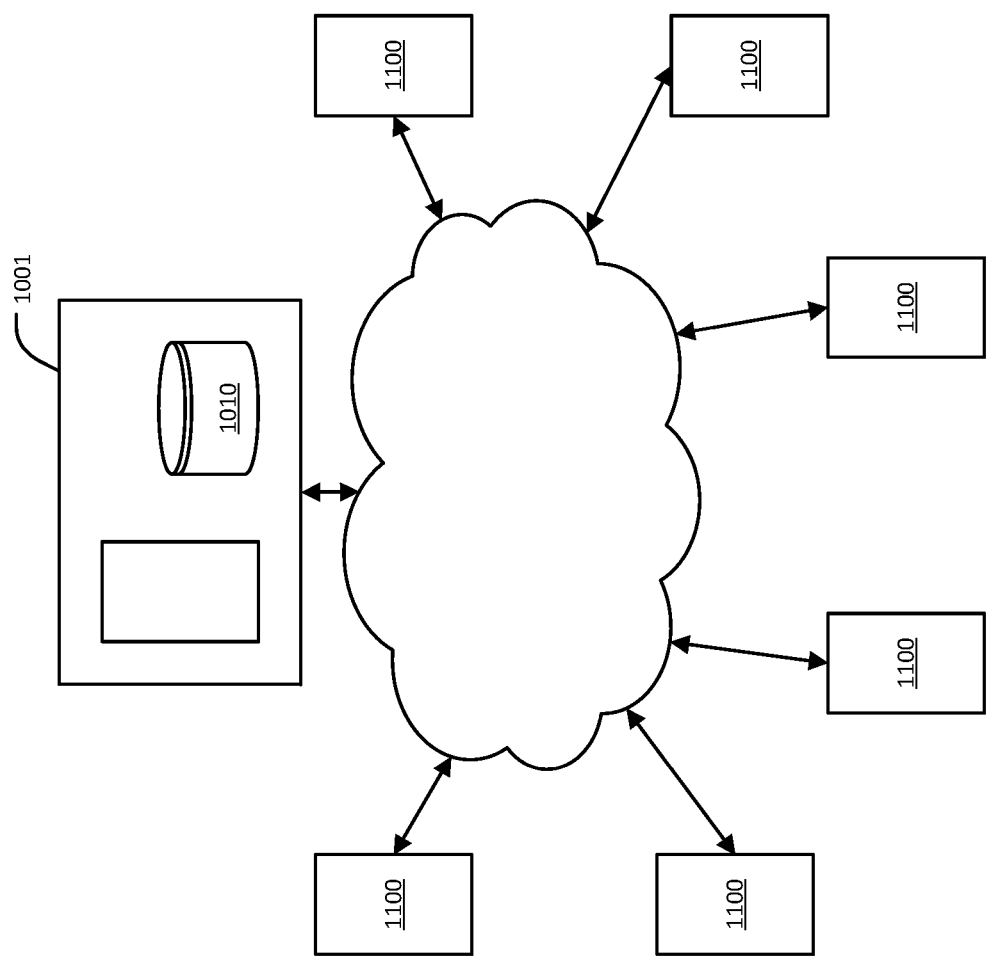
FIG. 10 is a block diagram of a computer system.

FIG. 10 illustrates an example of a computer system 1001, that provides for a computer network of web applications and/or servers 1100. Each web application or server 1100 may be implemented using a variety of different programming languages and protocols. Through the use of an API, the computer system 1001 can collect information across the different web applications/servers 1100, generate data based on the collected information, and share the generated data across the web applications/servers 1100 as appropriate based on specific criteria. Data regarding users of the different web applications/servers 1100 may be stored in a database 1010 of the system 1001, and dynamically updated in real time as users provide information to the web applications/servers 1100. Accordingly, the system 1001 is able to allow for sharing of data across the different web applications/servers 1100 and generate leads and incentivize only quality connections between users of the different web applications/servers 1100 through an appropriate algorithm.

The various examples described above provide both a technology solution and business model for small networking groups, chambers of commerce, alumni organizations, and other collections of like-minded people who would benefit from making connections. Niche groups are provided with an opportunity to pool their resources. Group organizers are given an ability to constantly acquire more data about their audiences in real-time. Their users are given an ability to communicate with those that best meet their needs, even if their best matches are found across other communities. Meanwhile, a flow control mechanism that defends against spam allows group organizers to reduce unwanted connection requests. As a whole, emphasis is placed on an algorithm which uses data to, not only decide who would want to know whom, but, more importantly, whom is most likely to engage in a productive conversation with whom.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a contextual connection system.

What is claimed is:

1. A computer-implemented method comprising:
   hosting a contextual connection system on a computing device, wherein the contextual connection system enables user interaction across disparate services, and wherein the contextual connection system includes a database and one or more database indexes;
   receiving data corresponding to one or more interactions between user devices associated with a set of users, wherein the data is received through a set of application programming interfaces (APIs) through which one or more applications of the user devices transmit the data as the one or more applications receive input, and wherein the data is stored in the database, wherein the APIs acquire data associated with the disparate services;
   combining the data across the database to determine contexts for the set of users, wherein the contexts include attributes shared amongst the set of users that a subset of the set of users choose to interact with or ignore;
   storing the contexts in the one or more database indexes;
   receiving an identification of an attribute, wherein the attributed is associated with a computing device;
   using the attribute to query the one or more database indexes for a context list of one or more contexts associated with the set of users that are similar to the attribute, and wherein the attribute is determined based on an examination of ongoing user interactions with the one or more applications;
   using the context list to generate a user list of one or more users from the set of users, wherein the one or more users have user contexts that include the attribute;
   facilitating a transmission that includes the user list, wherein the user list is usable to route communications to a device associated with the one or more users of the user list in real-time; and
   dynamically updating the database according to real-time interactions between the computing device and the devices associated with the one or more users of the user list, wherein dynamically updating the databases includes generating new contexts associated with the computing device and the devices associated with the one or more users.

2. The computer-implemented method of claim 1, wherein the user list is filtered according to a context.

3. The computer-implemented method of claim 1, wherein the user list is filtered according to a specific criterion.

4. The computer-implemented method of claim 1, wherein the user list is filtered according to an origination.

5. The computer-implemented method of claim 1, wherein the user list is filtered according to an attribute.

6. The computer-implemented method of claim 1, wherein the user list is filtered according to a constraint designed to increase a likelihood that a connection request will be accepted.

7. The computer-implemented method of claim 1, wherein the user list is filtered according to a constraint designed to de-incentivize connection requests that will be rejected.

8. A system, comprising:
one or more processors; and
memory storing thereon instructions that, as a result of being executed by the one or more processors, cause the system to:
host a contextual connection system on a computing device, wherein the contextual connection system enables user interaction across disparate services, and wherein the contextual connection system includes of a database and one or more database indexes;
receive data corresponding to one or more interactions between user devices associated with a set of users, wherein the data is received through a set of application programming interfaces (APIs) through which one or more applications of the user devices transmit the data as the one or more applications, and wherein the data is stored in the database, wherein the APIs acquire data associated with the disparate services;
combine the data across the database to determine contexts for the set of users, wherein the contexts include attributes shared amongst the set of users that a subset of the set of users choose to interact with or ignore;
store the contexts for the set of users in the one or more database indexes;
receiving an identification of an attribute, wherein the attributed is associated with a computing device;
use the attribute to query the one or more database indexes for a context list of one or more contexts associated with the set of users that are similar to the attribute, and wherein the attribute is determined based on an examination of ongoing user interactions with the one or more applications;
use the context list to generate a user list of one or more users from the set of users, wherein the one or more users have user contexts that include the attribute;
facilitating a transmission that includes the user list, wherein the user list is usable to route communications to a device associated with the one or more users of the user list in real-time; and
dynamically update the database according to real-time interactions between the computing device and the devices associated with the one or more users of the user list, wherein dynamically updating the databases includes generating new contexts associated with the computing device and the devices associated with the one or more users.

9. The system of claim 8, wherein the user list is filtered according to a context.

10. The system of claim 8, wherein the user list is filtered according to a specific criterion.

11. The system of claim 8, wherein the user list is filtered according to an origination.

12. The system of claim 8, wherein the user list is filtered according to an attribute.

13. The system of claim 8 wherein the user list is filtered according to a constraint designed to increase a likelihood that a connection request will be accepted.

14. The system of claim 8, wherein the user list is filtered according to a constraint designed to de-incentivize connection requests that will be rejected.

15. A non-transitory, computer-readable storage medium storing thereon executable instructions that, as a result of being executed by one or more processors of a computer system, cause the computer system to:
host a contextual connection system on a computing device, wherein the contextual connection system enables user interaction across disparate services, and wherein the contextual connection system includes a database and one or more database indexes;
receive data corresponding to one or more interactions between user devices associated with a set of users, wherein the data is received through a set of application programming interfaces (APIs) through which one or more applications of the user devices transmit the data as the one or more applications receive input, and wherein the data is stored in the database, wherein the APIs acquire data associated with the disparate services;
combine the data across the database to determine contexts for the set of users, wherein the contexts include attributes shared amongst the set of users that a subset of the set of users choose to interact with or ignore;
store the contexts in the one or more database indexes;
receiving an identification of an attribute, wherein the attributed is associated with a computing device;
use the attribute to query the one or more database indexes for a context list of one or more contexts associated with the set of users that are similar to the attribute, and wherein the attribute is determined based on an examination of ongoing user interactions with the one or more applications;
use the context list to generate a user list of one or more users from the set of users, wherein the one or more users have user contexts that include the attribute;
facilitating a transmission that includes the user list, wherein the user list is usable to the one or more users of the user list in real-time; and
dynamically update the database according to real-time interactions between the computing device and the devices associated with the one or more users of the user list, wherein dynamically databases includes generating new contexts associated with the computing device and the devices associated with the one or more users.

16. The non-transitory, computer-readable storage medium of claim 15, wherein the user list is filtered according to a context.

17. The non-transitory, computer-readable storage medium of claim 15, wherein the user list is filtered according to a specific criterion.

18. The non-transitory, computer-readable storage medium of claim 15, wherein the user list is filtered according to an origination.

19. The non-transitory, computer-readable storage medium of claim 15, wherein the user list is filtered according to an attribute.

20. The non-transitory, computer-readable storage medium of claim 15, wherein the user list is filtered according to a constraint designed to increase a likelihood that a connection request will be accepted.

21. The non-transitory, computer-readable storage medium of claim 15, wherein the user list is filtered according to a constraint designed to de-incentivize connection requests that will be rejected.

\* \* \* \* \*